US009489103B2

(12) United States Patent
Brier et al.

(10) Patent No.: US 9,489,103 B2
(45) Date of Patent: Nov. 8, 2016

(54) TECHNIQUES FOR OPTIMIZING STRINGING OF SOLAR PANEL MODULES

(75) Inventors: Travis Z. Brier, San Francisco, CA (US); Peter Rive, San Francisco, CA (US); Jenna Kappelt, San Francisco, CA (US); Damien C. Scott, Daly City, CA (US); Michael Lazzareschi, San Francisco, CA (US)

(73) Assignee: SolarCity Corporation, San Mateo, CA (US)

( * ) Notice: Subject to any disclaimer, the term of this patent is extended or adjusted under 35 U.S.C. 154(b) by 659 days.

(21) Appl. No.: 13/426,487

(22) Filed: Mar. 21, 2012

(65) Prior Publication Data

US 2013/0061189 A1  Mar. 7, 2013

Related U.S. Application Data

(63) Continuation of application No. 13/227,139, filed on Sep. 7, 2011.

(51) Int. Cl.
*G06F 3/0481* (2013.01)
*G06F 17/50* (2006.01)

(52) U.S. Cl.
CPC ............ *G06F 3/0481* (2013.01); *G06F 17/50* (2013.01); *G06F 2203/04803* (2013.01); *G06F 2217/06* (2013.01)

(58) Field of Classification Search
CPC ........... G06F 11/2035; G06F 17/5004; G06F 3/0481; G06F 17/50; G06F 2203/04083; G06F 2217/16
USPC ........................................................ 716/102
See application file for complete search history.

(56) References Cited

U.S. PATENT DOCUMENTS

| 5,754,738 | A  | * | 5/1998 | Saucedo ................ G06F 17/50 706/11 |
| 6,546,535 | B1 | * | 4/2003 | Nagao et al. ................. 716/120 |
| 7,272,464 | B1 | * | 9/2007 | Jurewicz, Jr. ....... G06F 17/5095 296/37.6 |
| 7,512,540 | B2 |   | 3/2009 | Gluck et al. |
| 8,352,220 | B2 |   | 1/2013 | Wayne et al. |
| 8,417,061 | B2 |   | 4/2013 | Kennedy et al. |
| 2002/0035451 | A1 |  | 3/2002 | Rothermel |
| 2008/0071604 | A1 |  | 3/2008 | Scanlan |

(Continued)

OTHER PUBLICATIONS

U.S. Appl. No. 13/227,139, filed Sep. 7, 2011, entitled "System and Methods for Mobile Design Automation".

(Continued)

*Primary Examiner* — Amy M Levy
(74) *Attorney, Agent, or Firm* — Kilpatrick Townsend & Stockton LLP

(57) ABSTRACT

Embodiments of the present invention include systems and methods for performing design automation on a mobile computer system. In one example embodiment the present invention includes a computer-implemented method comprising storing design automation data on a mobile device, displaying a plurality of design automation process steps to a user, the plurality of design automation process steps guiding the user through a design automation process for a project, receiving design automation input data from the user in the mobile device for a plurality of the design automation process steps, executing one or more data processing algorithms specific to at least one of the design automation process steps, and generating output data for the design project.

14 Claims, 25 Drawing Sheets

(56) References Cited

U.S. PATENT DOCUMENTS

| | | |
|---|---|---|
| 2009/0177458 A1 | 7/2009 | Hochart et al. |
| 2009/0234692 A1* | 9/2009 | Powell et al. .................... 705/7 |
| 2009/0304227 A1 | 12/2009 | Kennedy et al. |
| 2010/0217639 A1* | 8/2010 | Wayne ................. G06Q 10/103 705/7.23 |
| 2010/0217724 A1* | 8/2010 | Wayne et al. ................. 705/348 |
| 2011/0108087 A1 | 5/2011 | Croft et al. |
| 2011/0246338 A1* | 10/2011 | Eich ............................... 705/28 |
| 2013/0061142 A1 | 3/2013 | Brier et al. |
| 2013/0061198 A1 | 3/2013 | Brier et al. |
| 2014/0025343 A1 | 1/2014 | Gregg et al. |
| 2014/0025344 A1 | 1/2014 | Brier et al. |
| 2014/0032178 A1 | 1/2014 | Kicinski et al. |

OTHER PUBLICATIONS

Volkswagen "How to Read Wiring Diagrams: Symbols, Layout, and Navigation" (2001) available at <http://dept.sfcollege.edu/InTech/AUTO/content/courses/AER1698%20materials/How%20to%20read%20wiring%20diagrams.pdf>.

Shawal, M. & Talib, S. "Development of Expert System as an Evaluation Tool for Photovoltaic Power Supply" IEEE Nat'l Power & Energy Conf., pp. 292-295 (2003).

NonFinal Office Action in U.S. Appl. No. 13/556,025, mailed Aug. 28, 2014; 18 pages.

NonFinal Office Action in U.S. Appl. No. 13/426,503, mailed Jul. 10, 2014; 24 pages.

Non-Final Office Action for U.S. Appl. No. 13/227,139, mailed Dec. 20, 2013, 29 pages.

Final Office Action for U.S. Appl. No. 13/227,139, mailed Aug. 1, 2014, 22 pages.

Final Office Action for U.S. Appl. No. 13/426,503, mailed Jan. 2, 2015, 22 pages.

Notice of Allowance for U.S. Appl. No. 13/556,025, mailed Feb. 6, 2015, 9 pages.

Final Office Action for U.S. Appl. No. 13/426,503, mailed Aug. 8, 2016, 18 pages.

Endecon Engineering, A Guide to Photovoltaic (PV) System Design and Installation, Jun. 14, 2001, 40 pages.

Brailsford, et al. Constraint statisfaction problems: Algorithms and applications. © 1999 Elsevier Sicence B.V., 25 pages.

* cited by examiner

TECHNIQUES FOR OPTIMIZING STRINGING OF SOLAR PANEL MODULES

CROSS REFERENCE TO RELATED APPLICATIONS

This application is a continuation of U.S. patent application Ser. No. 13/227,139, filed Sep. 7, 2011, entitled "System and Methods for Mobile Design Automation", naming Travis Z. Brier, Peter Rive, Jenna Kappelt, Damien C. Scott, and Michael Lazzareschi as inventors, the contents of which is hereby incorporated in its entirety.

BACKGROUND

The present invention relates to computing, and in particular, to a systems and methods for mobile design automation.

In computer aided design automation ("design automation"), computers are used to design a wide variety of real world systems, objects, and devices. Everything from semiconductor integrated circuits to jumbo jets or spacecraft are commonly designed using design automation software. Construction is another example field where design automation has been employed. FIG. 1 illustrates design automation in a typical construction context. In the construction context, engineers and drafts people typically work to prepare electronic designs for a construction project 101 in a main office 102 of a construction organization using local computers 103. The computers may execute design automation software such as a computer aided design ("CAD") program, for example, to design various aspects of the construction project. CAD programs may be used to design residential homes, office buildings, factories, or even bridges, dams, or other infrastructure projects.

One type of construction project that exemplifies the limitations of traditional uses of CAD programs is a solar energy project. In a typical solar energy project, a salesperson may first visit a home to meet a potential customer. The salesperson may take notes on what the customer's preferences are for the solar energy system. Next, an auditor 150 may visit the customer to perform an energy audit of the home. The auditor may gather further data on the home's energy usage profile and details of the home's construction as a precursor to installation of a solar energy system in the home. Finally, a construction crew may install a solar energy system at the construction site.

Typically, as employees of a solar energy vendor make repeated trips to a customer's home, data is collected and presented to engineers back at the main office to be used to design the solar energy system. For example, engineers at the main office 102 may use a CAD program operating on main office computers 103 to model relevant portions of the home and create documentation for proper installation of the solar energy system at the construction site.

One problem with existing approaches to design automation is the physical separation between the engineering specialists using the automation software and the location where the design problems are being addressed. The separation of engineering from a construction site, for example, may result in several problems, including increased costs stemming from multiple additional employees visiting the site to relay information back to the engineering team and disconnects resulting from inaccurate or incorrect assessments of the site that result in erroneous design documentation. For instance, the employees who typically engage in customer contact are typically sales people and/or fields crews not technically trained to the level of engineers at the main office, and sending experienced engineering teams to every customer project may be extremely costly and inefficient.

More generally, separation between customers having engineering problems to be solved and the main offices where engineering specialists typically perform design automation leads to increased costs, slower design times, and an increased likelihood of errors in the design process.

Embodiments of the present invention improve design automation by providing systems and methods for mobile design automation.

SUMMARY

Embodiments of the present invention include systems and methods for performing design automation on a mobile computer system. In one example embodiment the present invention includes a computer-implemented method comprising storing design automation data on a mobile device, displaying a plurality of design automation process steps to a user, the plurality of design automation process steps guiding the user through a design automation process for a project, receiving design automation input data from the user in the mobile device for a plurality of the design automation process steps, executing one or more data processing algorithms specific to at least one of the design automation process steps, and generating output data for the design project.

The following detailed description and accompanying drawings provide a better understanding of the nature and advantages of the present invention.

BRIEF DESCRIPTION OF THE DRAWINGS

FIGS. 12-15 are examples of graphical user interfaces for assigning mounting planes according to one embodiment of the present invention.

FIGS. 21A-B are examples of graphical user interfaces for configuring conduit according to embodiments of the present invention.

DETAILED DESCRIPTION

Described herein are techniques for performing mobile design automation. The apparatuses, methods, and techniques described below may be implemented as a computer program (software) executing on one or more mobile computing devices, such as a laptop computer, a tablet computer with a touch screen input, or handheld mobile computer, for example. The computer program may further be stored on a computer readable storage medium or reside on a remote server that may be connected to by a mobile device. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 2:
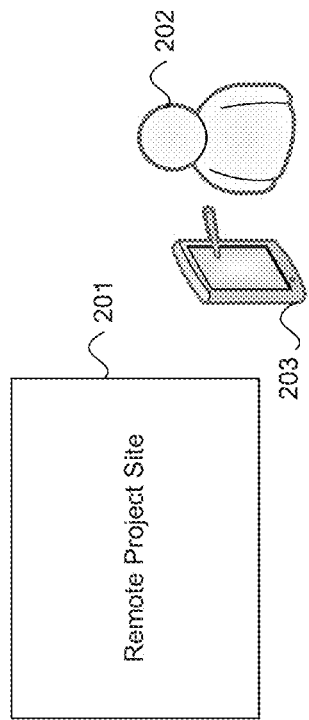
FIG. 2 illustrates mobile design automation according to one embodiment of the present invention.

FIG. 2 illustrates an embodiment of the present invention. In one embodiment, the present invention includes a mobile computing device 203 executing design automation software that allows a user 202 to design features of a project at the remote project site 201 (i.e., away from a main office). While embodiments and examples of the present invention are discussed in terms of construction projects and solar energy projects, it is to be understood that particular features and example may be advantageously used in a variety of other mobile design automation applications where a user enters information into the mobile device at a remote project site and generates a design typically produced by engineers or specialists at a main office.

Figure 3:
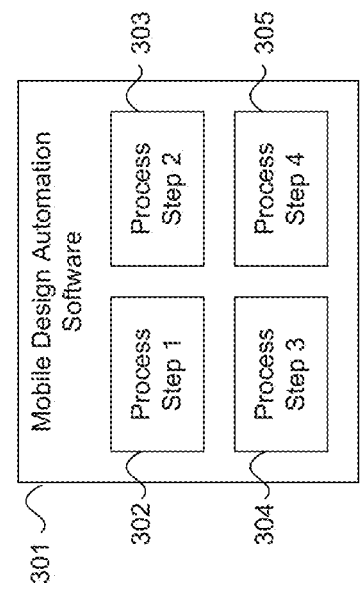
FIG. 3 illustrates mobile design automation software according to one embodiment of the present invention.

FIG. 3 illustrates mobile design automation software according to one embodiment. In one embodiment, mobile design automation software 301 simplifies the design process and guides the user through the steps required to complete the design. Mobile design automation software 301 may have data and process steps that are customized for a particular design process to guide a user through a series of process steps with design intelligence encoded in the software. In this example, mobile design automation software 301 includes process steps 302, 303, 304, and 305. In one embodiment, a user may perform each process step. Each process step may solicit specific data associated with the particular project and the particular process step being performed. Requested input data from the user may also be based on a process step specific algorithm operating on pre-stored data for the particular project, which determines the additional data required from the user to complete the algorithm. The user may enter data corresponding to the project and the particular process step into mobile design automation software 301, and mobile design automation software may execute a process step specific algorithm to determine if the process step is completed correctly. In one embodiment, the user is only allowed to move from one process step to the next if a previous process step is completed correctly (or returns a valid result). In some embodiments, particular steps may be skipped even if they are incomplete—steps that are purely data entry and aren't necessarily required to move the audit forward. In other embodiments, the program may be stateless, where data can be entered at any point and the necessary calculations/ decisions are performed for each task, for example. In one embodiment, the mobile design automation software may determine that each completed process step is valid using a process step specific algorithm. Embodiments of the present invention may include validation algorithms for each process step that determine if required data has been entered and if data processing results that use the required data for the process step return valid results. Accordingly, a user may be guided through the design process in a series of carefully crafted process steps for a specific type of project, where each step can only be validated if the user enters valid inputs for the step. An example of project specific steps is illustrated below for solar energy projects.

Figure 1:
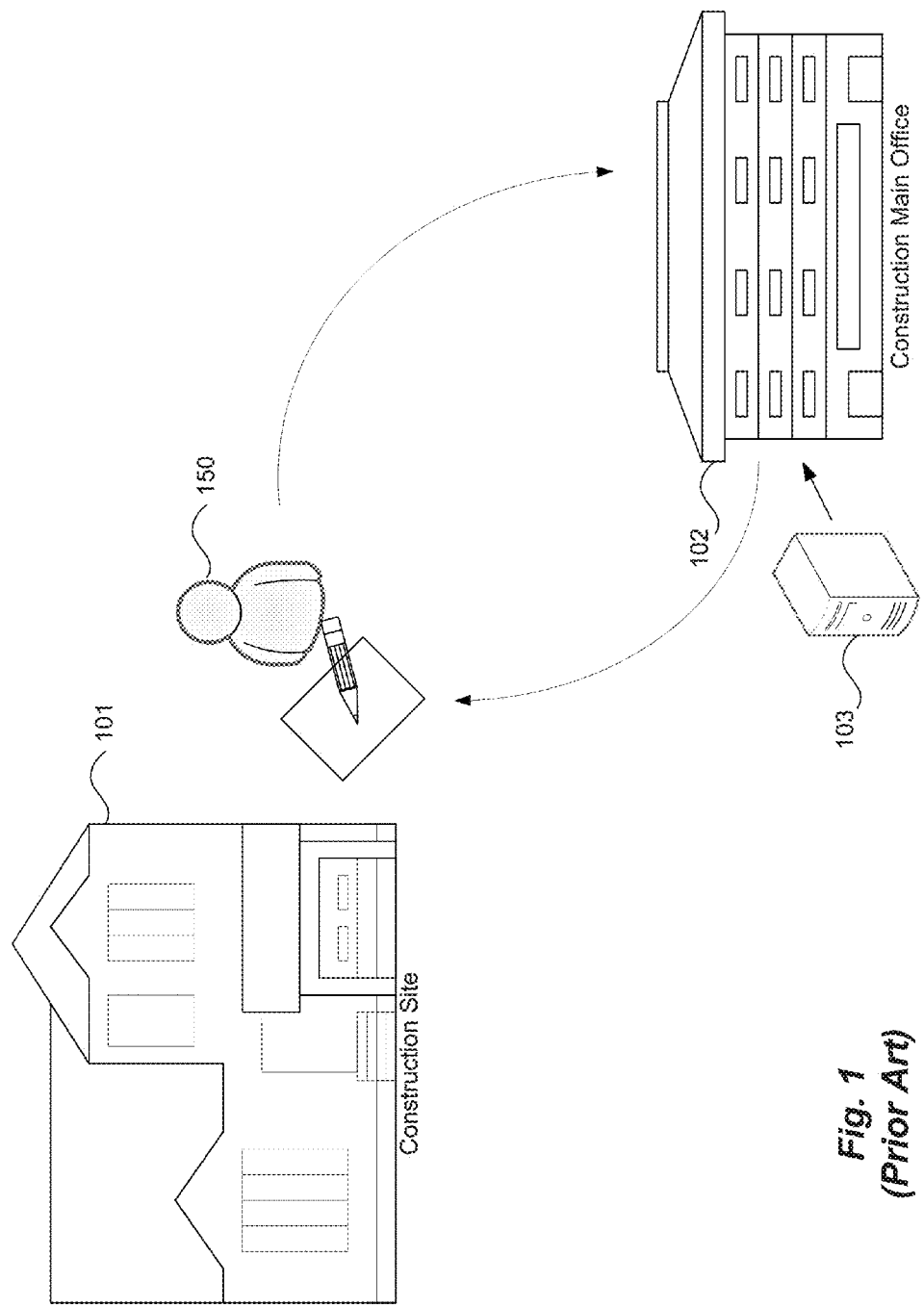
FIG. 1 illustrates a typical design automation scenario.
Figure 4:
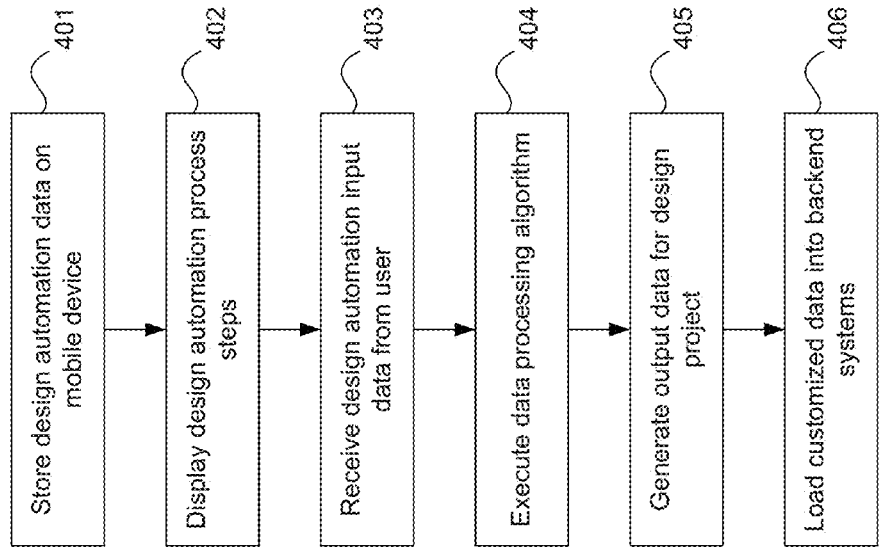
FIG. 4 illustrates a mobile design automation process according to one embodiment of the present invention.

FIG. 4 illustrates another embodiment of the present invention. At 401, design automation data is stored on a mobile computing device. The user may load a wide variety of data specific for a particular type of project on the mobile device before visiting the remote site, for example. In one embodiment, metadata specifying project requirements may be uploaded to the software system. In a construction context, metadata specifying project requirements may include a list of requirements for a type of project (e.g., requirements of an authority having jurisdiction (AHJ) for a solar project as described in more detail below, or a list of common building stock in that area, or snow, wind, or seismic load data) with a Boolean value or a quantitative value associated with each requirement to specify whether the requirement applies to the particular project being worked on or to what degree. For example, the mobile device may determine that one or more projects are in a particular jurisdiction and apply one more applicable AHJ rules to all projects in the particular jurisdiction. At 402, the user may activate the mobile design automation software on the mobile device and the design automation process steps are displayed to the user. At 403, design automation input data is received from the user. The input data may be received in response to specific algorithms for process steps for a particular type of project. At 404, a data processing algorithm for particular process steps may be executed to process the received data and possibly prestored data, for example. At 405, output data for the design project is completed. For example, the user may enter data at each process step, an algorithm operates on the input data and validates the process step, and when all the process steps are completed, the system generates a project output (e.g., design documents). At 406, the data for the project, and generated project outputs, may be loaded into a backend system at the office. For example, in one embodiment data for a particular project may be loaded into multiple backend systems to create a physical manifestation of the design, order required materials from third parties, schedule personnel, tools, and other resources, and create entries in a finance and accounting system to account for the costs and potential revenues of the project, for example.

Figure 5:
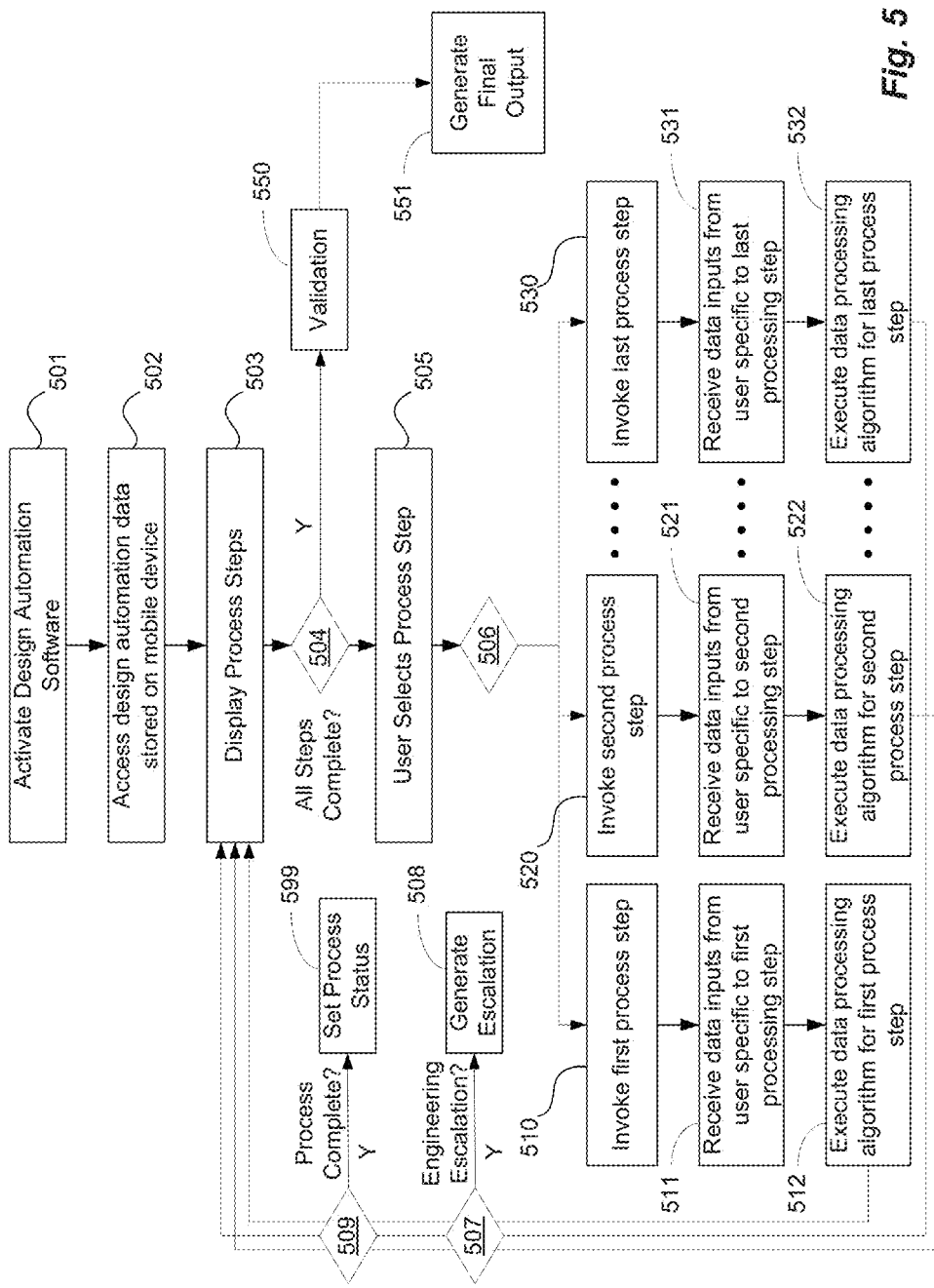
FIG. 5 illustrates a mobile design automation process according to one embodiment of the present invention.

FIG. 5 illustrates another embodiment of the present invention. At 501, a user may activate mobile design automation software on a mobile device. At 502, the software system may access design automation data stored on the mobile device, such as customized data for a particular project the user is working on (e.g., entered by others into the database earlier in the conversation with the customer) and preloaded data corresponding to different user specified options in the software, for example. At 503, process steps for the project are displayed to the user.

In some embodiments, the software can step a person in the field (e.g., an auditor) through the design process (e.g., an audit) in the most efficient way possible depending on the context of what the user observes on site. The user enters data into the system about the design constraints obtained on site, and the data constrains the design process steps that the user can execute. For example, in one embodiment, the remote design process may be structured as a decision tree to step the user through only the steps or questions relevant to a particular project for a particular customer (e.g., as determined by responses to earlier questions and data loaded into the system for a particular job).

Figure 6:
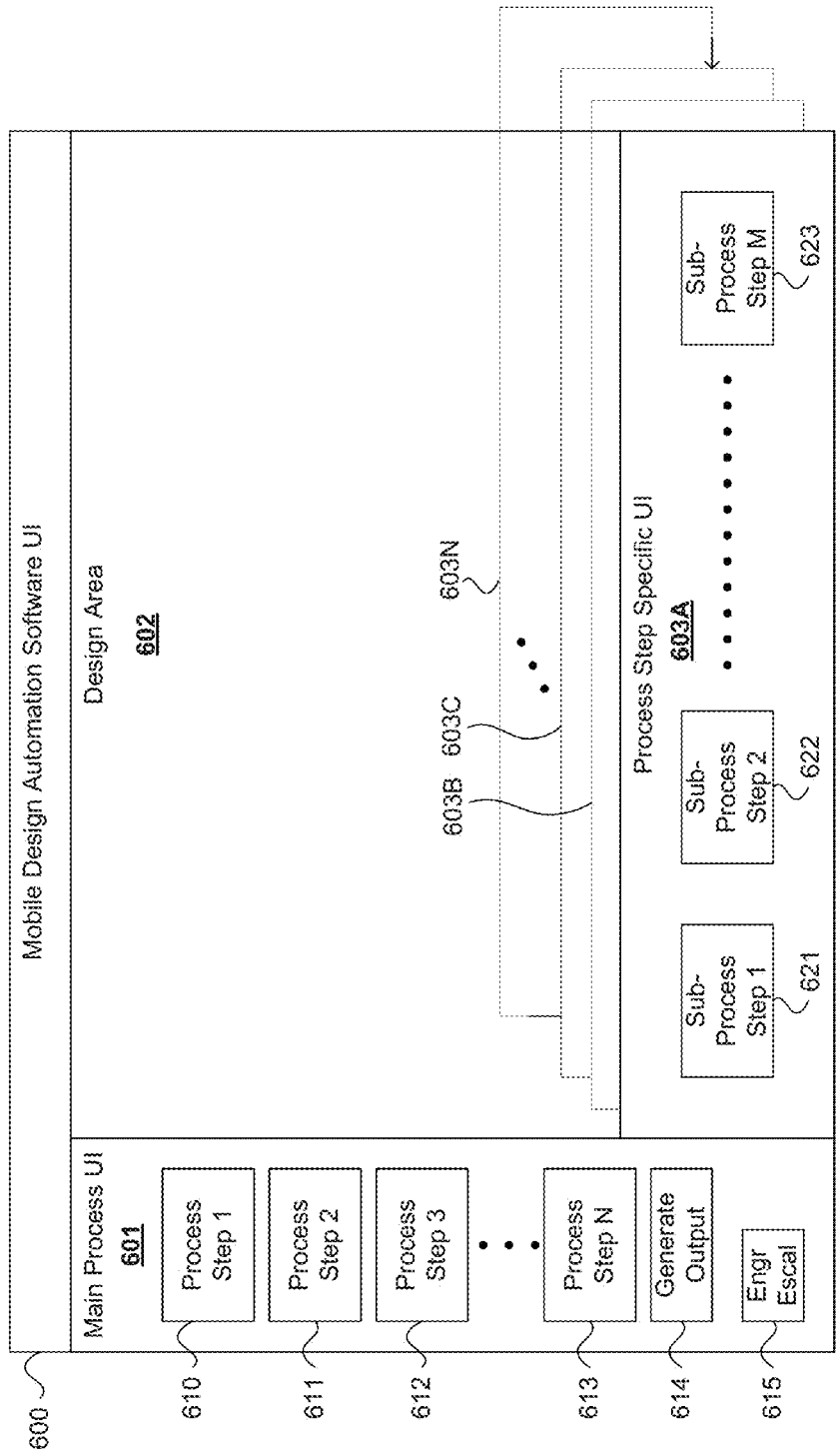
FIG. 6 illustrates a graphical user interface according to one embodiment of the present invention.

FIG. 6 is an example graphical user interface (GUI) according to one embodiment. When the user activates the mobile design automation software, the mobile device may display GUI 600. GUI 600 includes a main process user interface (UI) 601, design area 602, and multiple process step specific UIs 603A-N. Main process UI 601 may include icons for multiple process steps 610-613. A user is guided through the different process steps by clicking of the different icons 610-613, which represent N different process steps, where N is an integer. When different process step icons are accessed, UI 600 displays different process step specific UIs. For example, when a user selects process step 610, UI 600 displays process step specific UI 603A, when a user selects process step 611, UI 600 displays process step specific UI 603B, when a user selects process step 612, UI 600 displays process step specific UI 603C, and when a user selects process step 613, UI 600 displays process step specific UI 603N. Each process step specific UI comprises sub-process step icons for accessing pre-defined functionality associated with the particular process step. For example, process step specific UI 603A includes icons 621-623 representing M different functions associated with process step 610, where M is an integer.

Referring again to FIG. 5, when the process steps are initially displayed, a user may select a process step at 505. In one embodiment, the system may require that the process steps be selected sequentially so that the user is guided through the design process according to a predetermined sequence of steps. A selection control step 506 may, in some embodiments, prevent the user from selecting process steps before other prerequisite processes have been completed. For example, when process step 610 is selected (FIG. 6), the software system may invoke the first process step at 510 (FIG. 5). Accordingly, GUI 600 may display UI 603A, which includes process step specific icons 621-623.

At 511 in FIG. 5, data inputs from the user specific to the first process step may be received. For example, UI 603A may include data entry fields or data creation mechanisms. Alternatively, different icons 621-623 may invoke different sub-processes including data entry fields or invoking different specific data creation mechanisms associated with a particular process step specific icon (e.g., specific CAD functions). Further, at 512 in FIG. 5, one or more data processing algorithms for the first process step 610 may be executed at 512. Referring to FIG. 6, invoking UI 603A may invoke a particular algorithm for processing data, or invoking one of icons 621-623 may invoke different sub-process algorithms for processing data. For example, in one embodiment design area 602 may include a computer aided design (CAD) program and accessing process step 610 may activate limited features of the CAD program, and icons 621-623 may invoke different specific features of the CAD program for simplifying creation of a design according to a simplified step-by-step/function-by-function approach for manipulating data. As a particular example, accessing process step 1 icon 610 may cause the system to retrieve a basic schematic (e.g., engineering drawing) of a particular project. Each of icons 621-623 may invoke a particular feature of a CAD program for manipulating the schematic one feature at a time to allow a user to adjust the schematic and enter data available at the remote project site. By limiting features and data entry to parameters only available at the remote project site, for example, the system guides the user through the process without requiring (or in some cases allowing) the user to manipulate a broader range of parameters more thoroughly understood by an expert at the main office. The user acts to enter and verify data available at the remote project site without being required to perform a full and complete analysis traditionally performed by highly trained experts in the main office, for example.

In some embodiments, process step algorithms may include rules for determining if an engineering escalation is to be generated. For instance, after execution of algorithm 512, a step 507 may check the input data and determine if the data received from the user and processed by the algorithm resulted in an engineering escalation. An engineering escalation may occur if the input data does not pass particular predefined criteria for the check. For example, an engineering escalation may occur if the input data is out of range, unavailable, or if manipulation of the parameters of the schematic in the design area violates a predefined rule. In some embodiments, engineering escalations may occur if certain pre-defined scenarios are met (e.g. a certain type of panel or roof type is encountered, or where more detailed structural calculations may be required to determine the best way to safely install a system). If the user's input triggers an engineering escalation, an entry may be generated for the escalation at 508. For example, a new field of a database or new line of a text document may be generated describing the nature of the engineering escalation. A plurality of rules for predefined functions of each process may have particular corresponding engineering escalations that are created if the rules are violated to ensure the data entered into the software by the user results in a proper design. If any one of the rules is violated, a corresponding specific engineering escalation may be generated so that the design may be reviewed by specialists in the main office to ensure quality of the design. Further, at 509, each process step may be checked to determine if the process step is complete. If the process step has been completed and the input data is valid (e.g., no engineering escalations), then a process status may be set at 599. A status indicator for each different process step may allow control step 506 to enable and disable access to different process steps, for example. Once a process step is completed, GUI 600 may update the displayed icons, by changing the color of the completed process step from Red to Green, for example, at 503 and the user may select the next process step at 505.

According to the above description, a user may select (e.g., sequentially) other process steps. For example, a user may invoke the second process step at 520, receive input data specific to the process step at 521, execute a process specific data processing algorithm at 522, check for engineering escalations at 507, and set the process status at 599. Similarly, a user may invoke the additional process steps to the final process step at 530, receive input data specific to each process step including the final process step at 531, execute a process specific data processing algorithm for each process step including the final process step at 532, check for engineering escalations at 507, and check the process status at 509. While steps 507 and 509 are illustrated here as along a common path for the different process steps, it is to be understood that some embodiments may use different procedures for determining escalations and process completeness. In some embodiments, escalations and process completeness may be incorporated into the process specific algorithms, for example, and may be illustrated with the specific process step. Referring to FIG. 6, as different process step icons 611-613 are selected, different process specific UIs are display to the user with different data entry fields and/or functions for processing data according to each process step.

Some embodiments of the present invention may operate on customized templates that are loaded into the electronic device before a job is performed. For example, some types of jobs (projects) may have a number of previously known component options that are used in the project. As illustrated below as an example, design documents for a solar power project may have a number of known blocks in the schematics that are used across multiple implementations. In one embodiment, a master template includes a superset of multiple design blocks for a schematic. The master template may be customized by either deleting blocks that are not required for a particular project or adding project specific blocks used in a particular project. Example blocks are computer aided design blocks (CAD) used in a program such as AutoCad, for example. Blocks may include components of design plans or schematics such as text blocks, blocks having particular attributes, or representations of one or more electrical or physical components (e.g., inverters, wires, beams), for example.

Figure 7A:
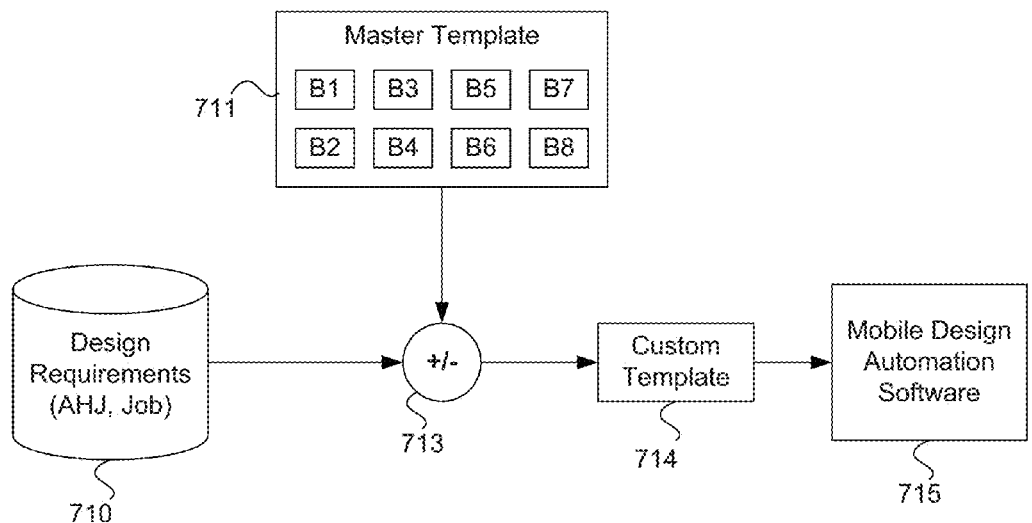
FIGS. 7A-B illustrate master template customization according to one embodiment.

FIG. 7A illustrates master template customization according to one embodiment. In this example, a master template 711 includes a plurality of CAD blocks (e.g., B1-B8). The master template may be customized for a particular job by deleting blocks unnecessary for the particular job or adding job/project specific CAD blocks to a custom template 714. Addition and subtraction of blocks is illustrated at 713. One or more custom templates 714 may be loaded into mobile design automation software 715 for use on corresponding projects. In one embodiment, design requirements for a particular project are accessed and used to modify the custom template. Design requirements may be stored on a computer system, such as in a database 710, for example. Design requirements may include rules to determine if a particular block from the master template is to be removed or if a project specific block is to be added to the custom template. In one embodiment, attributes of a particular job are analyzed using such rules to determine particular blocks to be added to or deleted from the master template. Design requirements may pertain to information about a particular authority having jurisdiction (AHJ). For example, a particular city may require a particular size of paper for the design plans, setbacks, notes, or other particularities. Project specific blocks may be stored in database 710 or at a specified location on the computer system, for example.

Figure 7B:
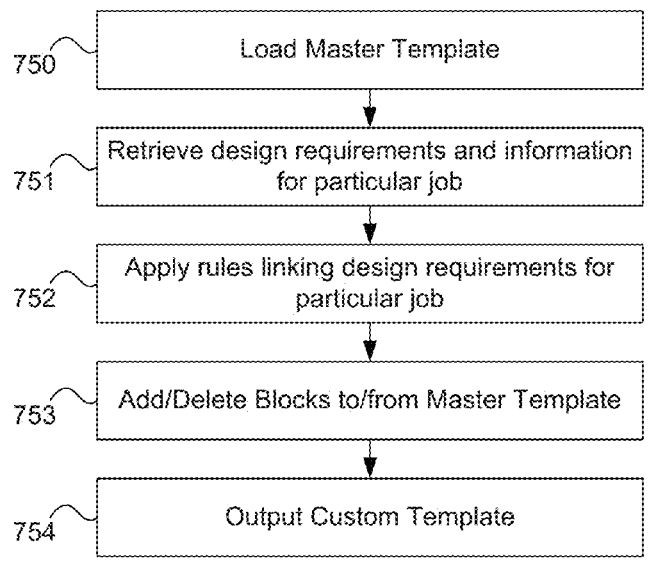

One example process for customizing a template is shown in FIG. 7B. At 750, the master template is accessed. At 751, design requirements and information for a particular job are retrieved. At 752, rules are applied to link design requirements to particular jobs. For example, the system may used a job ID to determine a State in which the job is being performed. A particular rule may indicate that if a job is in California, then a particular text field should be included in a particular notes section of the plan documents. In this case, the system may access a block including the particular text used for California jobs. At 753, blocks are added to or deleted from the master template. Continuing the example above, the system inserts the project specific block into the custom template at a specified location. Once all the design requirements have been processed, the system outputs a custom template, which may be loaded into mobile design automation software 715 for use on the particular job.

Figure 8:
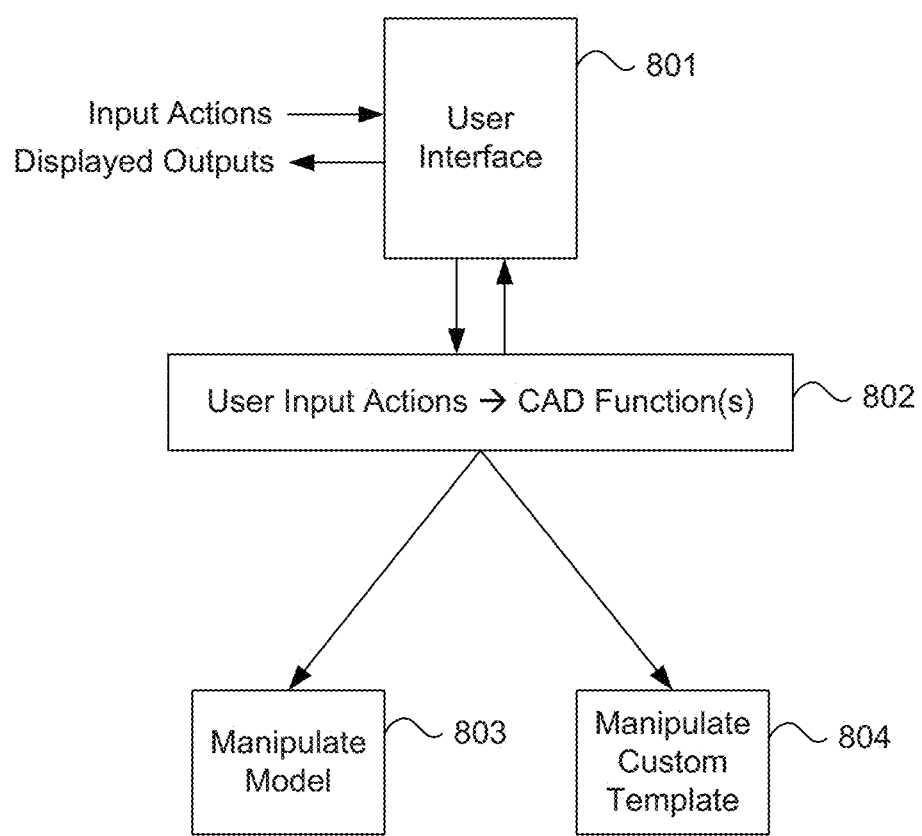
FIG. 8 illustrates customized CAD according to one embodiment.

FIG. 8 illustrates customized CAD according to one embodiment. In some embodiments, the user interface for designing a project in the field may be customized to support a predefined set of user input actions corresponding to particular CAD functions, which may be correspond to simple commonly used functions anticipated for designing a particular type of job. As illustrated in FIG. 8, a set of user input actions may be mapped to one or more particular CAD functions. In particular, the system may only allow a user to perform certain predefined input actions in the user interface as illustrated at 801, such as placing a design component, connecting the design component, or entering particular data for the design component. However, some user input actions may not directly cause CAD functions to implement the desired user input action. Rather, a user input action may be mapped to multiple CAD functions at 802. Multiple CAD functions may be used to manipulate a model 803 representing the design (e.g., an electrical model or structural model) or such CAD functions may be use to manipulate the custom template 804, or both. For example, a particular user input action may select the cross section cut of a roof that a user might like to show. All user does is place the line at the appropriate place on the roof. This single user input is automatically mapped to the following CAD functions: the architectural representation of section views are automatically generated on a site plan; a front section view is automatically created (with blocks and lines in CAD); standoff detail is automatically created, as well as some standard BOM parts (e.g., this may be a single block); and a side section cut is automatically generated. The system may automatically place the multiple CAD blocks in appropriate places based on where they are drawn in the site plan by the user, for example. Further, the system may perform checks on model 803 and custom template 804 (e.g., as they are modified) to determine if execution of the CAD functions corresponding to a user input action results in an engineering escalation.

EXAMPLE APPLICATION AND IMPLEMENTATION

Solar Power Installation

Figure 9:
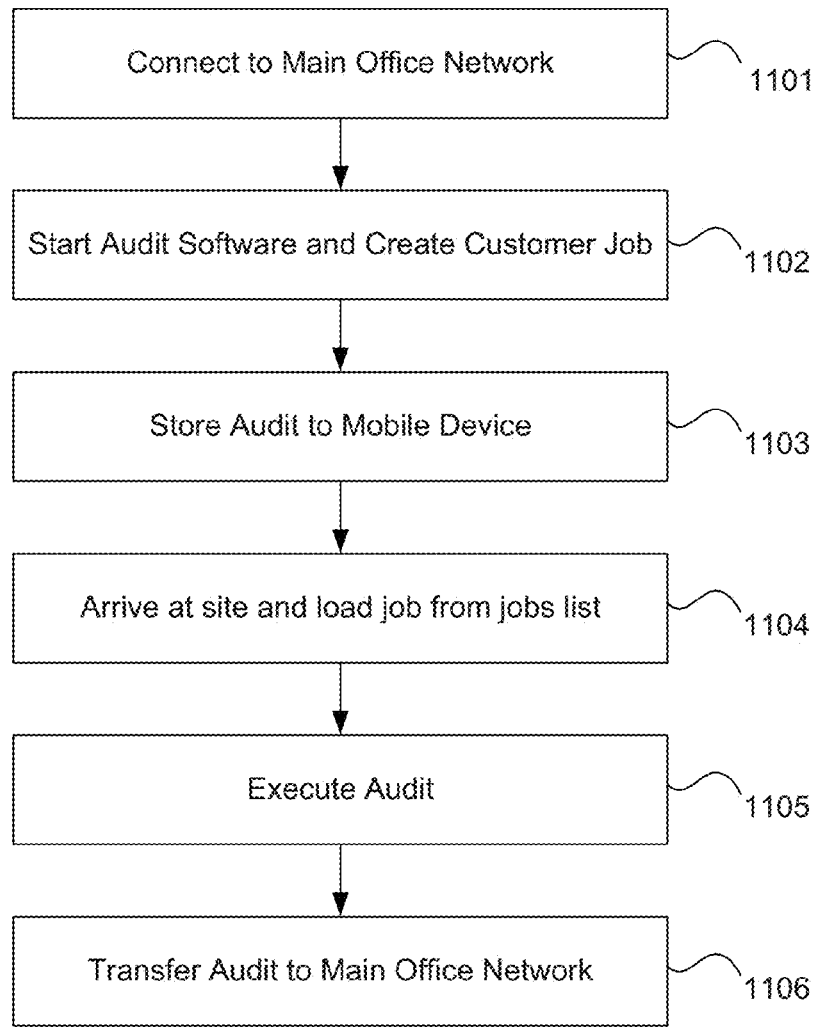
FIG. 9 illustrates a mobile design automation process according to one embodiment of the present invention.

FIG. 9 illustrates a process for using a mobile computing device to perform a solar power installation project. In a solar power installation project application, a field technician, for example, may load a mobile device with data for a particular installation project at a particular installation site and use the mobile device to execute software performing at least some of the features described above to obtain the information required to install a solar power system at the site. In particular, a technician may audit the job site and enter in a variety of data about physical attributes of a solar power installation at a particular installation site. The data may be used to tailor the solar power system to the physical attributes of a particular installation site and to generate installation documentation for designing, permitting and installing the solar power system, for example. Features and advantages of the present invention include using a mobile device loaded with data and specialized software to allow a technician to perform a job site audit to generate a complete set of installation documentation (e.g., construction documents) with engineering involvement reduced or entirely eliminated. While the following example illustrates an application in the context of a residential solar energy system project (or photovoltaic "PV" system), it is to be understood that other embodiments may be used in a wide range of applications. As further example energy projects, some embodiments of the present invention may be used in electric vehicle charging projects, energy storage projects, energy efficiency project, solar hot water projects, metering/monitoring projects, or building controls and automation projects to name just a few.

An overview of the process is illustrated in FIG. 9. At 1101, the field technician (or auditor or just "user") connects to a network at the main office. At 1102, the user starts the audit software and either creates a customer job or loads an existing customer job that needs a site audit. At 1103, data for a particular site audit may be loaded to the mobile device. For example, in one embodiment the user may load a schematic site file onto the mobile device, such as a Precigeo file, where solar and roof schematics are obtained through the analysis of aerial imagery, for example. The user may further load information pertaining to an authority having jurisdiction ("AHJ") as mentioned above. Typical AHJs include state, county, or city governments or utility companies, for example. AHJ files may include specific requirements for physically locating certain objects on a property or how equipment is to be installed or configured, for example. Appendices A and B illustrate two example metadata files loaded to the mobile device. Appendix A illustrates AHJ metadata for electrical and Appendix B illustrates AHJ metadata for mounting planes. As illustrated in Appendix A and B, data loaded from a main office computer may include AHJ data, project specific data, and financial data, for example. AHJ requirements applicable to a particular project are listed between "AHJAuditNotes_Key" followed by a value marked as TRUE or FALSE. If an AHJ requirement is followed by a value set to TRUE, then the particular AHJ requirement is applicable to the particular project. A value of FALSE indicates that the particular AHJ requirement is not applicable to the particular project. Other data imported into the mobile device is illustrated in Appendix A and B. Names of the example variables in the attached appendices are representative of each variables use within the system.

At 1104, the user arrives at the site and loads the job from a job list. A user may perform many audits between visits to the main office, thereby increasing efficiency of labor usage, and so data for multiple different audits may be stored on the mobile device for the user to select. At 1105, the user performs the audit as described in more detail below. At 1106, data for the complete audit may be transferred back to the main office computer network for integration into other software systems (e.g., a supply chain management software system) and coordination of the actual installation. Appendices C and D illustrate example metadata files provided from the mobile design automation software to a backend system.

Figure 10:
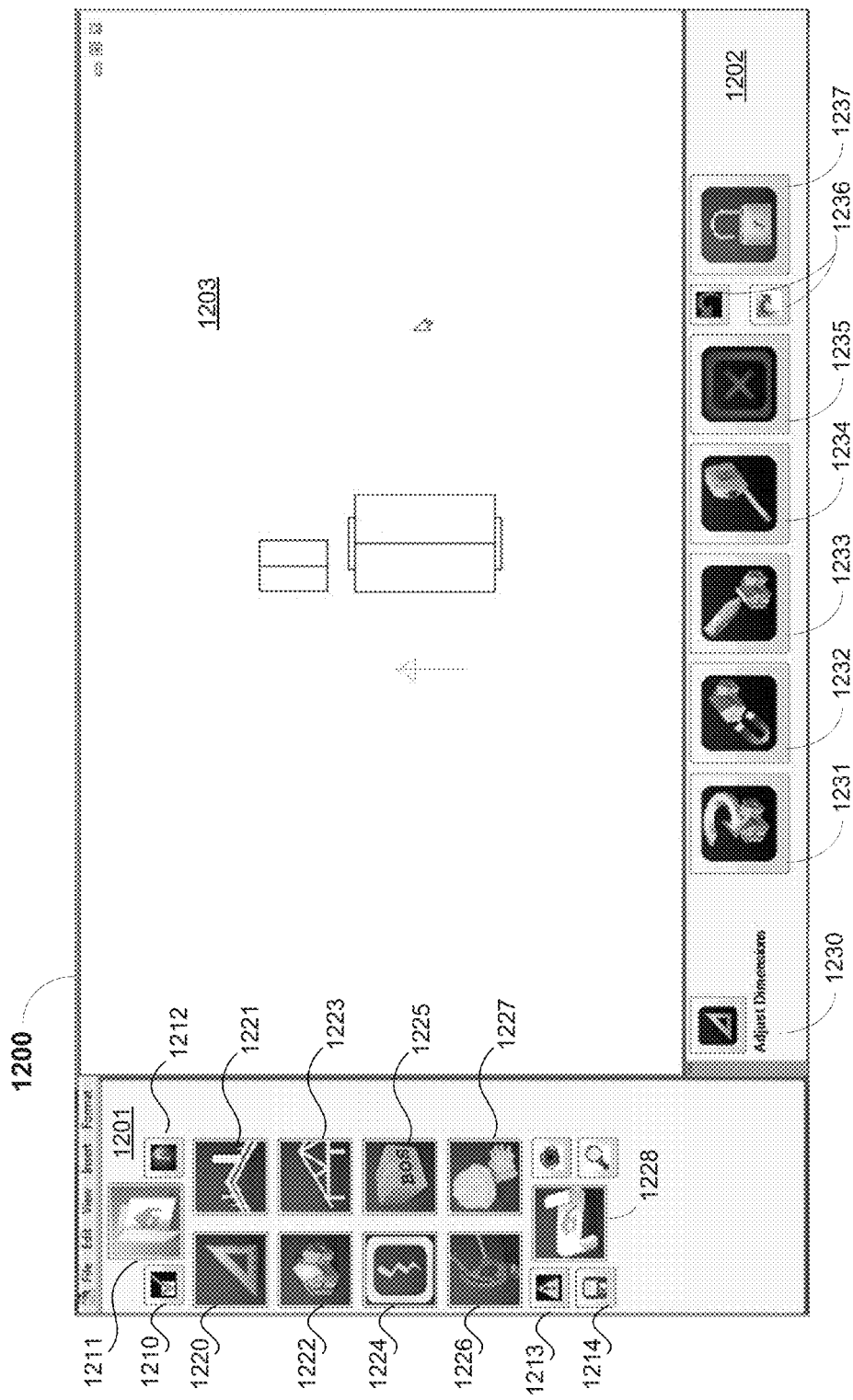
FIG. 10 is an example of a graphical user interface for adjusting dimensions according to one embodiment of the present invention.

FIG. 10 illustrates a process according to one example embodiment. In this example, a software system executing on a mobile device generates GUI 1200. GUI 1200 includes a main menu 1201, process step specific user interface 1202, and a design area 1203. Mobile automation design software may include a CAD program to create a project in the design area 1203 based on icons in process step specific interfaces, for example. Main menu 1201 displays icons (or buttons) 1210-1214 and 1220-1228. Icons 1220-1228 corresponds to different solar power installation design process steps. In this example, the solar power installation design process steps include adjusting dimensions at the site 1220, adding obstructions 1221, specifying mounting planes 1222, specifying mounting plane structure 1223, entering electrical information 1224, configuring electrical components 1225 (e.g., Balance of System), drawing conduit 1226, specifying a safety plan 1227, and generating installation documentation 1228 (e.g., a PDF of a plan set). Each of the above example process steps is described in more detail below. Further, menu 1201 includes an icon 1210 for displaying AHJ notes, an icon for opening a new project 1211, an icon for viewing engineering escalations 1212, an icon for exporting data out of the system for further analysis 1213, and an icon for saving data in the project 1214. The solar power installation process steps each include limited partitioned functionality to guide a user through a solar power installation process for a project as illustrated by this example in the following Figures. At different steps, the user may be prompted for particular data inputs to generate complete installation documentation with reduced engineering support.

As illustrated in more detail below, in some embodiments different process steps may have different associated user interfaces and may have different associated data processing algorithms. For example, when a user selects the adjust dimensions icon 1220, a user interface 1202 is displayed to the user. Additionally, the design area 1203 may include a schematic of the project (here, a schematic of a home) imported into the project from the main office, for example. In this example, the particular process step specific user interface 1202 for the adjust dimensions icon 1220 includes additional icons and algorithms for adjusting dimensions of an installation site. For example, interface 1202 includes a graphic 1230 displaying the same graphic as icon 1220 to associate interface 1202 with icon 1220. Interface 1202 further includes a rotate icon 1231 to rotate the design through a range of orientation angles, a move walls or nodes icon 1232 to adjust the dimensions of the structure to place walls or corners are specified locations at the site, an add new building lines icon 1233 to add building lines to represent actual building structural configurations that are observed at the site but which do not appear in the schematic of the structure (i.e., as received from the main office), and tape measure icon 1234 to measure distance between points in the schematic and verify the schematic against actual measurements taken at the site. Accordingly, each icon activates functionality to receive additional information about the project based on data most readily available, if not exclusively available, at the site. The user may advantageously tailor the design documents at the site with a simplified interface.

Interface 1202 further includes a delete button for deleting data from the project and redo and undo buttons 1236. Finally, in this example, when a user has performed any one or more of the desired functions associated with process step specific user interface icons 1231-1234, the user may select the lock icon 1237. In this example, when the lock icon is selected, the user signals to the system that the particular process step is complete and the corresponding icon in the main menu changes color to indicate the step is complete. Changes in color may be from red to green, where red indicates a process step is not complete and green indicates a process step is complete, for example. In one embodiment, the lock button completes verification of the current step and applies design automation processing associated with the design step. The processing that the lock button performs is related to the particular process step.

Design area 1203 displays the solar power installation project. In this example, a schematic top view of a residential home is illustrated (e.g., from a Precigeo file). In other embodiments, other schematics of other types of projects may be shown. The basic schematic may be the starting point for a design. As the user moves through each of the process step icons, the user may be prompted to enter more data to design the solar power system to be installed at the site, including site specific information such as the physical attributes of items including physical attributes shown in the examples below.

Figure 11:
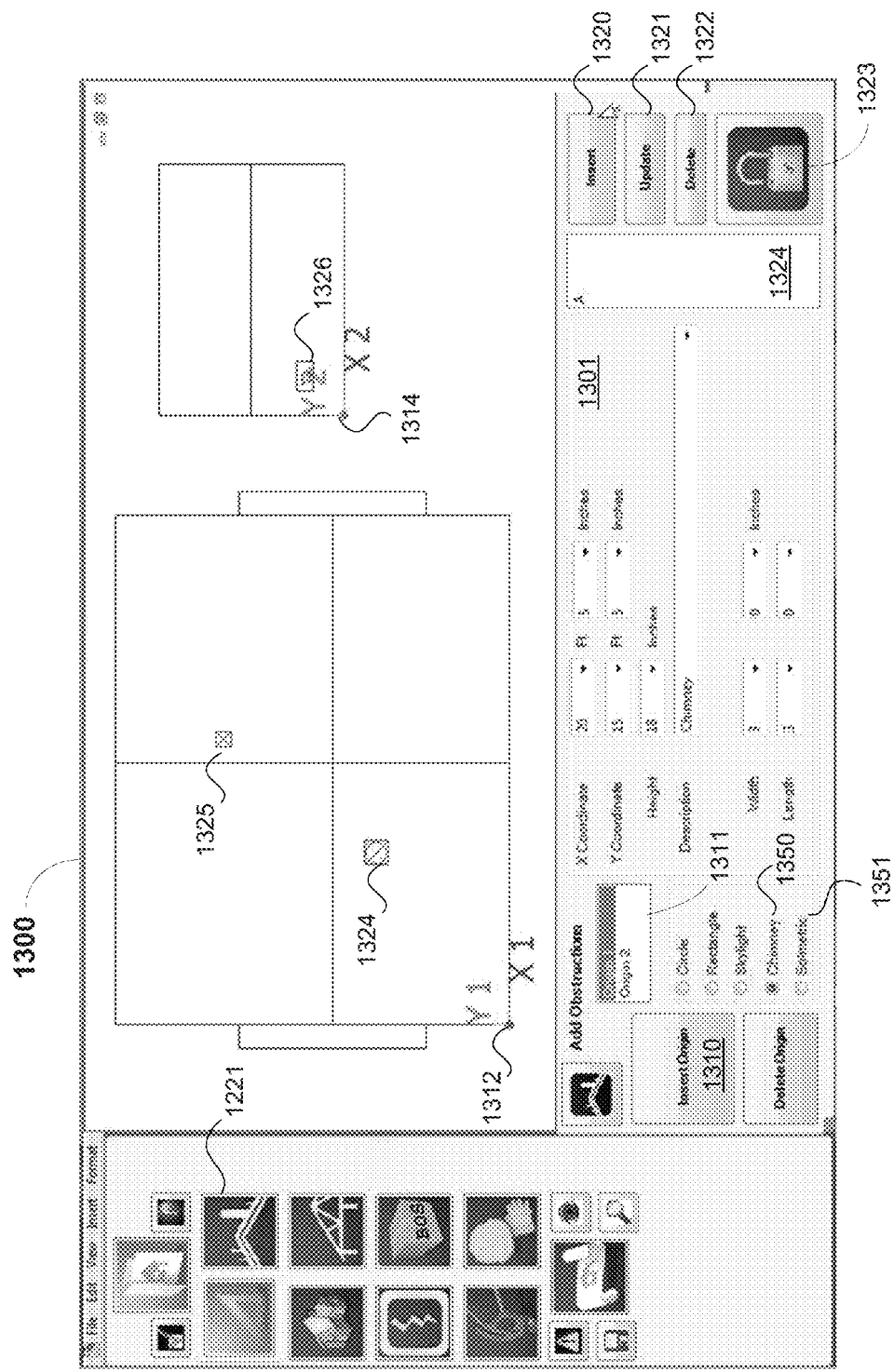
FIG. 11 is an example of a graphical user interface for adding obstructions according to one embodiment of the present invention.

FIG. 11 illustrates a process to add obstructions according to one example embodiment. In this example, a user may audit the roof of a home and identify certain obstructions in the roof, such as a chimney, a skylight, ventilation pipe, antenna/dish, etc. . . . using interface 1300. In this example, when a user selects the add obstruction button 1221, an interface 1301 for adding obstructions is displayed. A user may first select an "insert origin" button 1310 to set an origin 1312 ("X1, Y1") in the design area. Positions of obstructions added to the design area may be specified relative to origin 1312. In this example, two origins 1312 and 1314 are added for two different structures at the site. A user may add obstructions for each structure by selecting the relevant origin and entering information about the obstruction. For example, a first obstruction 1324 may be identified as a chimney by selecting radio button 1350. Once the data for chimney 1324 is entered, a user may select the Insert button 1320 (for new obstructions) or the Update button 1321 to update data for an existing obstruction. The chimney is shown as obstruction "A" in the menu 1324. Obstructions may be deleted by selecting the delete button 1322. Other example obstruction types illustrated are skylight and the locations of solar measurement readings. This example project includes a skylight 1325 and solar reading 1326.

In one embodiment, when the obstruction type is a solar measurement reading (e.g., Solmetric 1351), interface 1301 may generate an input field for receiving a solar reading. Solar readings may be conducted using a shade analysis tool, such as a tool by Solmetric, Inc., for example, which produces a measurement tool with a fisheye camera and a dedicated on-board processor to perform digital image processing and analysis to compute shading and solar access percentages and may include an electronic compass and inclinometer enabled to measure roof pitch and azimuth, for example.

The obstruction may also be identified by a general shape, such as circle or rectangle, for example. Additional physical parameters for the obstruction received through obstruction interface 1301 may include an X-coordinate in feet (ft) and inches, a Y-coordinate in feet (ft) and inches, a height of the obstruction, a description, a width, and length, for example.

When a user has completed adding obstructions for a particular project, the user may select the lock button 1323. When the lock button 1323 is selected, the add obstruction icon 1221 may change color signifying that the process step is complete.

Figure 12:
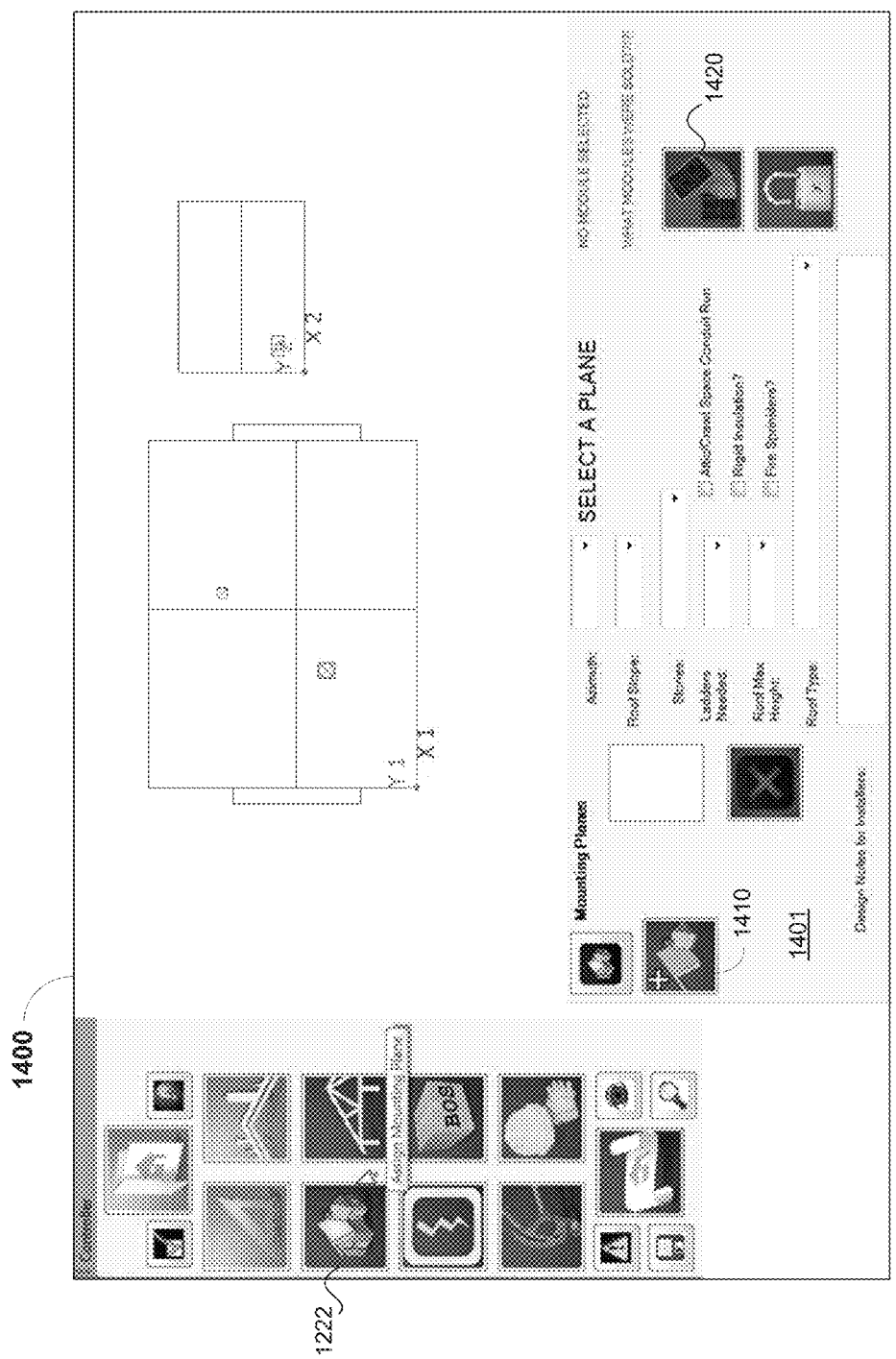
Figures 13, 14:
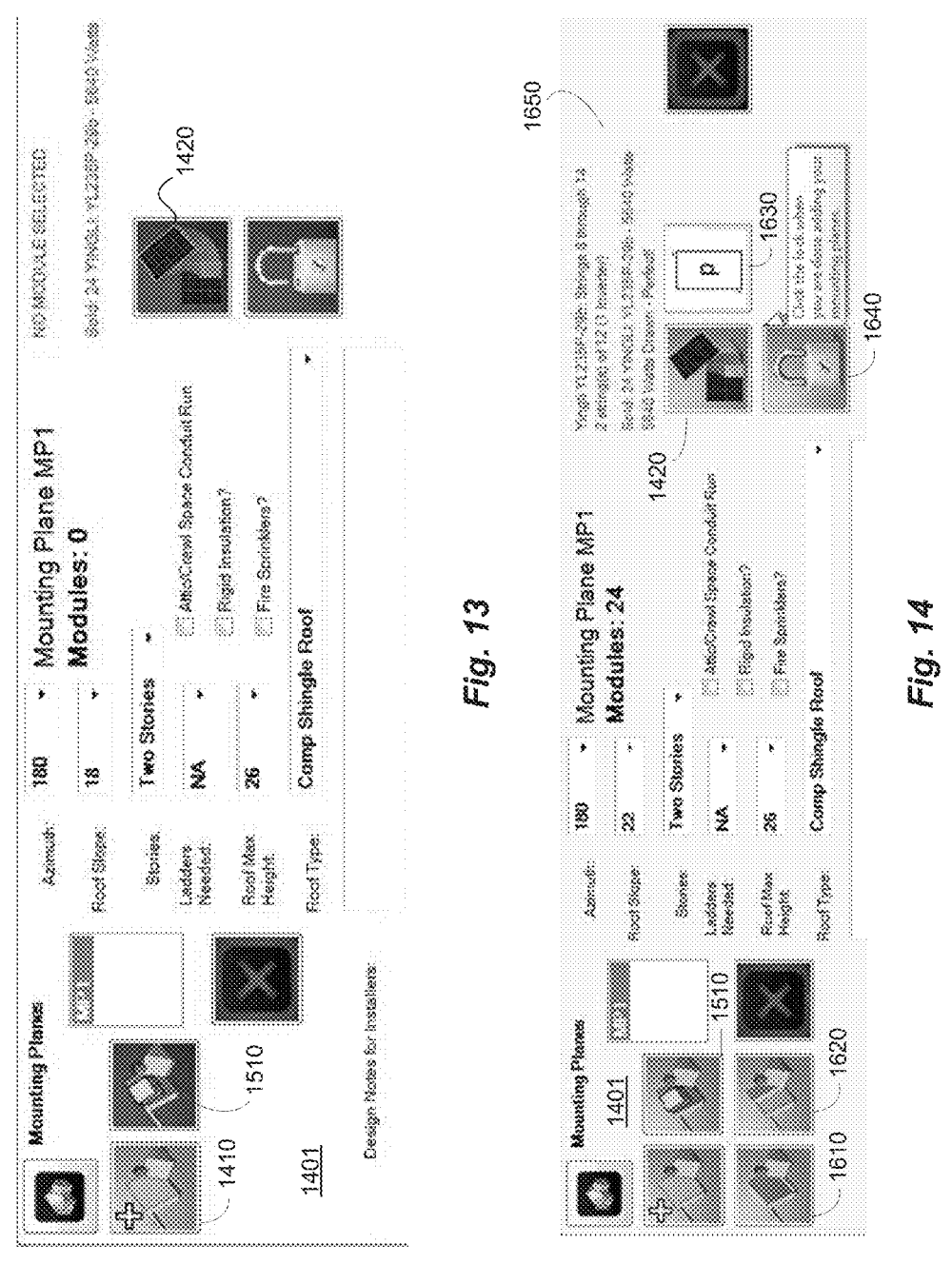
Figure 15:
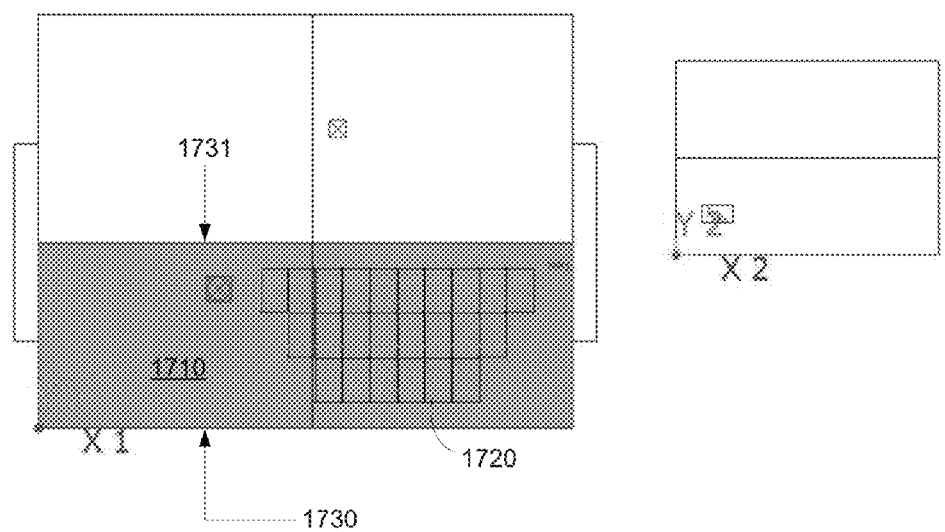

FIG. 12 illustrates a process to assign mounting planes according to one example embodiment. In this example, a user may audit the roof of a home and identify certain areas of the roof where solar panels may be mounted. Particular portions of a roof where solar panels may be mounted are referred to as mounting planes. A mounting plane may be a single planar segment of a roof, for example. A roof may have one or multiple mounting planes that could be used to support a solar system. In one embodiment, a user may select particular mounting planes of a roof for the project in the design area and assign different mounting planes to different roof segments. In this example, when a user selects the assign mounting plane icon 1222, an interface 1401 for assigning mounting planes is displayed. A user may first select an add mounting plane icon 1410 to add a mounting plane in the design area. A new icon 1510 may appear for assigning an area to the mounting plane as shown in FIG. 13. The user may select the area to assign to the mounting plane in the design area and designate a location for the mounting plane label to be displayed in the design area. The resulting mounting plane 1710 (MP1) is shown in FIG. 15.

Referring again to FIG. 12, mounting plane interface 1401 may allow a user to enter a variety of additional physical attributes about the specified mounting plane, including azimuth, roof slope, number of stories, whether a ladder is needed, roof maximum height, roof type (e.g., composite shingle), design notes for installers, and whether or not there is attic crawl space for a conduit run, rigid insulation, or fire sprinklers, for example.

In this example, when the mounting plane is assigned using icon 1510, icon 1510 may change color, for example, and two additional icons 1610 and 1620 are displayed to the user (See FIG. 14). Icon 1610 may be used to assign a ridge and eave to the mounting plane to set the physical orientation of the mounting plane. For instance, a user may select icon 1610 and then mouse click on the upper edge of mounting plane MP1 to set the ridge and then mouse click on the lower edge of mounting plane MP1 to set the eave. FIG. 15 shows the designated ridge 1731 and eave 1730 for an example project. Similarly, icon 1620 may be used to specify structural changes that may occur in a single mounting plane.

Referring again to FIG. 13, the data for a particular project may include information about the type of system sold to a particular customer. In this example, the customer was sold the following modules: 24 YINGLI YL235P-29b—5640 Watts, where information about the solar panels to be installed may be loaded into the mobile device from a sales program used by the sales team (e.g., at the main office). Alternatively, a user may mouse click module selection button 1420. The system may prestore a plurality of module types available for selection by a user. When module selection button 1420 is selected, the prestored module types (e.g., module models and manufacturers) are displayed to a user and the user may select the module type that was sold to the particular customer.

In this example, when the module type is selected, module selection icon 1420 changes color to indicate that the step of the process is completed, and a new module drawing icon 1630 is displayed (See FIG. 14). Module drawing icon 1630 allows the user to draw solar power modules on a particular location of a mounting plan in the drawing area. For example, a user may draw solar power modules 1720 in FIG. 15 at a particular location on mounting plane 1710. In one embodiment, data for the project may include an AHJ filed used to limit the placement of the solar modules. For instance, the AHJ may be used to determine a fire setback, for example. The system may further determine invalid module placements based on physical and electrical rules limiting placement and connectivity. For example, an AHJ may prohibit putting panels over bathroom plumbing vents. Thus, the auditor may be required to place panels elsewhere. As another example, a home owners associate may not want any panels to be seen from the street outside of the house. In this case, an auditor may be required to not place any panels on any mounting planes tilted towards the street. As an electrical example, a utility company may require that an AC disconnect be placed directly next to any inverter. Accordingly, an auditor may be required to find a place that can fit both an inverter and AC disconnect on the wall of the building. As another electrical example, in some locations where there is extreme heat (e.g., Arizona), it may be unadvisable to place inverters on sun facing walls. In this example, an auditor may be required to find a space inside the garage to place the inverter.

In this example, as a user places modules on the mounting plane, the system automatically determines how many more modules are needed to meet the energy requirements specified in the sale. For instance, as the user places modules on the mounting plane, the system may calculate the amount of energy generated by the currently placed modules and display the energy for currently placed modules and total amount of energy required, thereby indicating that additional modules are to be placed on the mounting plane. Design status is shown at 1650 and may include an indication of the amount of power or modules needed to meet the system requirements, for example.

Features and advantages of some embodiments may include evaluation and confirmation of design parameters. For example, in one embodiment a process step may include an algorithm that provides feedback to a user to indicate whether or not the design the user has entered is feasible, and may evaluate an optimum design if multiple design options exists. In one embodiment, the system may receive inputs from the user on the physical attributes of the design, attempt to disprove that a solution exists, and then determine a best solution from existing solutions. In this example, the system performs an automated calculation of electrical stringing of the modules and notifies the user if the module design is not feasible (e.g., if no stringing solution exists). If multiple possible stringing solutions exist, the system may output the optimum stringing solution for the particular physical attributes of the project. Strings typically comprise multiple modules connected in series of voltage potential (e.g., like AA batteries in a flashlight). Multiple strings may be connected in parallel. Different strings typically have the same voltage potential difference (e.g., string lengths are the same length). The combined output of a string(s) is typically the input for an inverter. In some embodiments, a process step may include an algorithm for providing feedback to the auditor to indicate if the design has an electrically feasible stringing solution based on the stringing requirements of a particular module utilizing an inverter supply, ambient temperature of the region, and physical attributes of each mounting plane where the modules are placed. The individual electrical characteristics of the modules result in the voltage difference potential of each string. Further, each inverter has a range of potential input voltages. As long as the string voltage potential falls into the allowable range of the inverter the system will produce energy. Some embodiments of the present invention may determine the voltages from strings of modules and determine if the stringing configurations are compliant with a particular inverter, for example.

Figure 16:
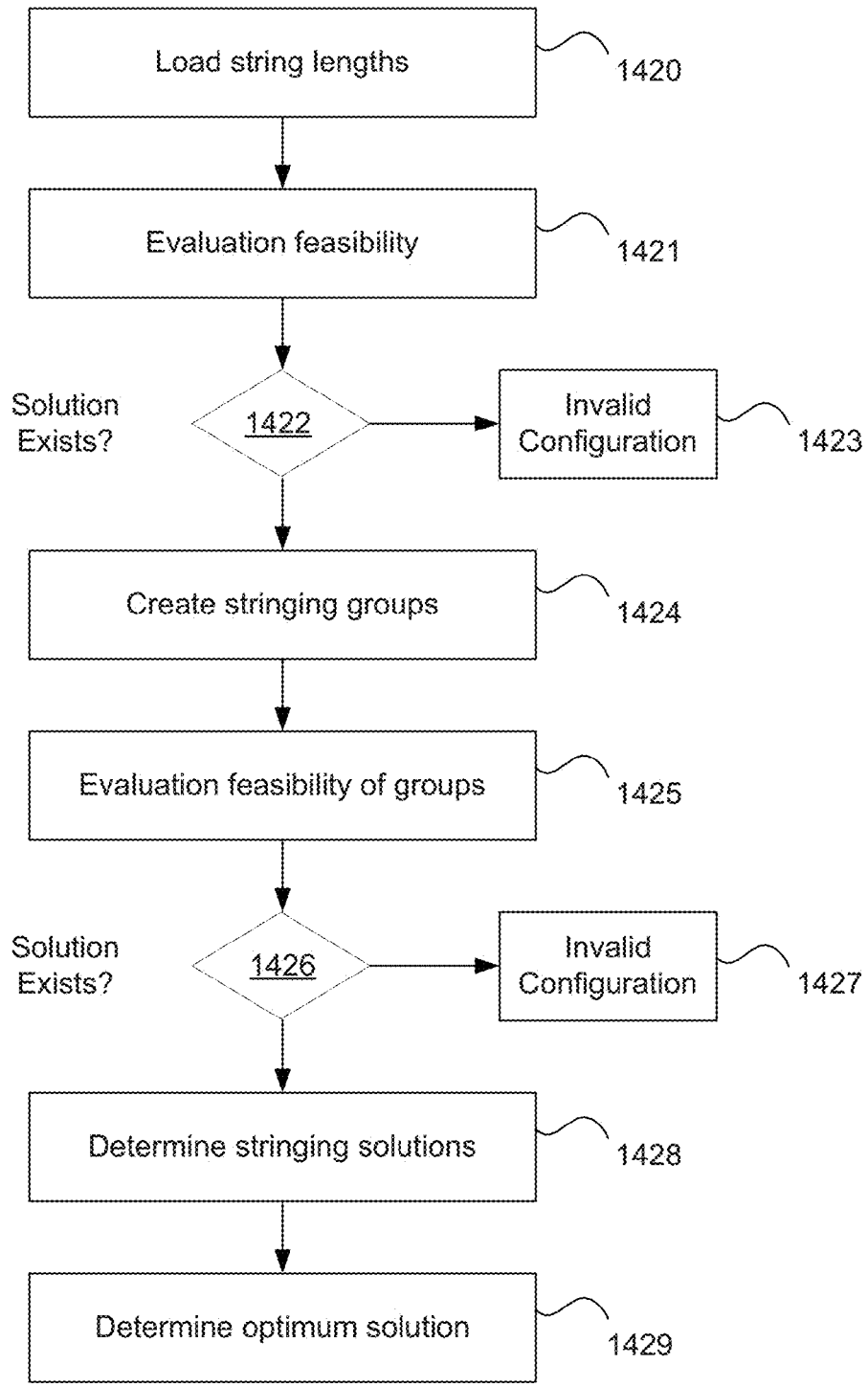
FIG. 16 is an example of a process for determining stringing of solar panels according to one embodiment of the present invention.

FIG. 16 illustrates an algorithm for analyzing stringing of solar panel modules according to one embodiment of the present invention. In this example, string lengths are loaded at 1420. For example, the system may load all possible string lengths for a module given a set of inverters from a supply chain and an ambient temperature. The result may produce a list of distinct possible string lengths, for example. Next, at 1421, the system may evaluate feasibility of the design. For example, a recursive check may be performed against the total number of modules in the system to make sure the system level is solvable (e.g., if the user has drawn 13 modules, but the module string lengths are {7 . . . 12}, then no summation of a set of these numbers will get 13). At 1422 the system checks for invalid solutions and the user may be notified of an invalid configuration at 1423.

At 1424, stringing groups may be generated. For example, in one embodiment, all the mounting planes in the system may be parsed and contained modules of like tilt and azimuth may be combined into stringing groups. Stringing groups are groups of modules that are able to be combined into similar string lengths. Stringing groups may maintain metadata on the position of each module and its association with the mounting plane and the stringing group.

Another evaluation of feasibility of the stringing groups may be performed at 1425.

For example, a similar recursive check on each module group may be performed to make sure that it can be solved with the given string lengths. For instance, if there are 16 modules at a 170 degree azimuth and a 20 degree tilt, and 13 modules at a 190 degree azimuth with an 18 degree tilt, the 16 module group can be broken into two strings of 8, but the 13 module group can't be broken down with the given string lengths. Some embodiments of the present invention may disprove that a solution exists before actually solving for the best solution because such an approach is faster and when the systems becomes more complex the design may have more solutions that don't work than solutions that do. At 1426 the system checks for invalid solutions and the user may be notified of an invalid configuration at 1427, for example.

At 1428, the system determines the stringing solutions. For example, if both the checks in 1422 and 1426 have passed, then at least one solution is available. Accordingly, the system may recursively determine every stringing solution per stringing group. For example, a stringing group of 24 modules with available string lengths of {7 . . . 12} has solutions of: [12, 12], [8, 8, 8], [7, 7, 10] (maybe more). All these stringing solutions may be saved and associated with a particular string group.

At 1429, an optimum stringing solution is determined For example, after the possible stringing solutions for each stringing group are obtained, the system may figure out what is the 'best' solution for the installation crews. The general rules that govern the definition of best may include: fewest inverters, longest string lengths, and modules of like strings lying close to each other. These three factors may be indicative of the shortest amount of time for installation, for example. Given all of the stringing groups and their possible string lengths, the system may combine and recombine all the strings of the design and assign every possible solution a weighted value. In one example implementation, an equation that may be used is as follows:

(20*NUMBER_OF_INVERTERS)+((1+TOTAL_DELTA_OF_ALL_STRINGS)* NUMBER_OF_STRINGS)

For instance, in the example of a stringing group of 24 from above:

[12,12]=20*1+(1+0)*2=22

[8,8,8]=20*1+(1+0)*3=23

[7,7,10]=20*2+(1+3)*3=52

As a result, the optimum string length of [12,12] which is the lowest number may be generated and provided to the user. Example program code for a particular implementation written in C# is illustrated in Appendix E attached hereto.

Returning to FIG. 14, when the required number of modules are placed on the mounting plane to meet the target energy generation specification with a valid stringing solution, the system indicates that the module design is complete. FIG. 15 shows a full set of modules 1720 placed in a particular location on a mounting plane by a user for a particular project. Similar to previous process steps, when the mounting plane is assigned and the module placed on the mounting plane, a user may select the lock icon 1640 (e.g., FIG. 14) to indicate that the mounting plane process step is complete, which causes the lock icon 1640 and mounting plane icon 1222 in FIG. 12 to change color indicating these steps are complete.

Figure 17:
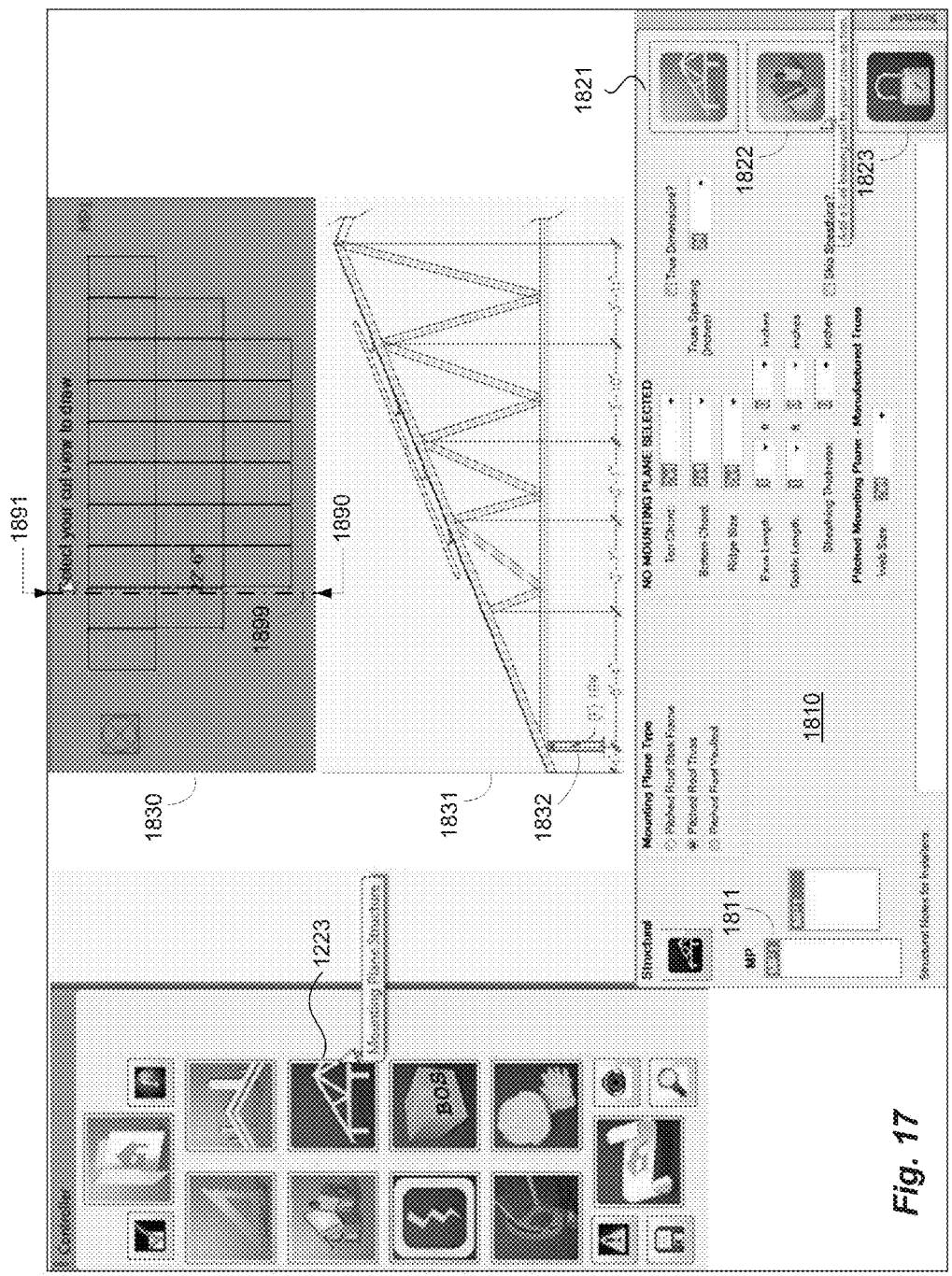
FIG. 17 is an example of a graphical user interface for specifying mounting plane structure according to one embodiment of the present invention.

FIG. 17 illustrates a process to specify mounting plane structure according to one example embodiment. In this example, a user may audit the physical structure of a roof and specify structural details of a support structure under a particular mounting plane. For instance, when a user selects the mounting plane structure icon 1223, an interface 1810 is displayed for specifying a mounting plane support structure. A user may first select a particular mounting plane at 1811. In this example, mounting plane 1830 is selected. The user may select the mounting plane type in interface 1810 from a set of predetermined roof structure types, which in this example may be any one of pitched roof stick frame, pitched roof truss, or pitched roof vaulted.

The user may further select the draw structure icon 1821. Accordingly, a graphic representation of the support structure 1831 corresponding to the selected mounting plane type is displayed in the design area. Further, the user may identify a location for a cut view. The cut view sets the location of the cross section of the mounting plane to be used for specifying the structure under the mounting plane. A cut view 1899 is illustrated between 1890 and 1891. In this example, pitched roof truss was selected as the mounting plane type. Therefore, the system displays a truss structure 1831 along the cut view 1899 under mounting plane 1830. Further, since pitched roof truss was selected, data entry fields for physical parameters of the truss structure are displayed to the user, which include top chord dimensions, bottom chord dimensions, ridge size, truss spacing, eave and gable length, sheathing thickness and, for a pitched mounting plane, web size, for example. It is to be understood that input fields for other physical parameters of other structure types may be provided in interface 1810. In this example, a user may further specify load bearing walls 1832 (LBW) by selecting add load bearing wall icon 1822. More generally, it is to be understood that other structural parameters of other project types may be specified in a similar manner. As before, the user may select the lock button when the mounting plane structure is complete and the mounting plane structure icon 1223 may change color to indicate that this particular process step is complete.

Figure 18:
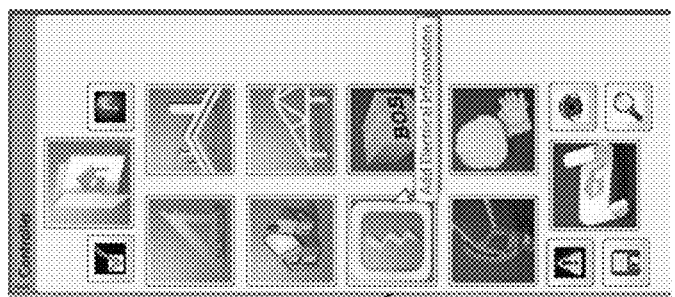
FIG. 18 is an example of a graphical user interface for specifying electrical information according to one embodiment of the present invention.

FIG. 18 illustrates a process to entering electrical properties according to one example embodiment. In this example, a user may audit the site and enter the electrical attributes physically present at the site by selecting add electrical information icon 1224 and entering information into interface 1910. For example, the user may enter information about the main panel, electrical service, and main breaker as illustrated in FIG. 18. In one embodiment, the user may specify if one or more physical parameters satisfies multiple predetermined criteria. For example, the user may specify if a gateway location satisfies multiple criteria including distance from inverter and elevation from inverter as shown in FIG. 18.

Figure 19:
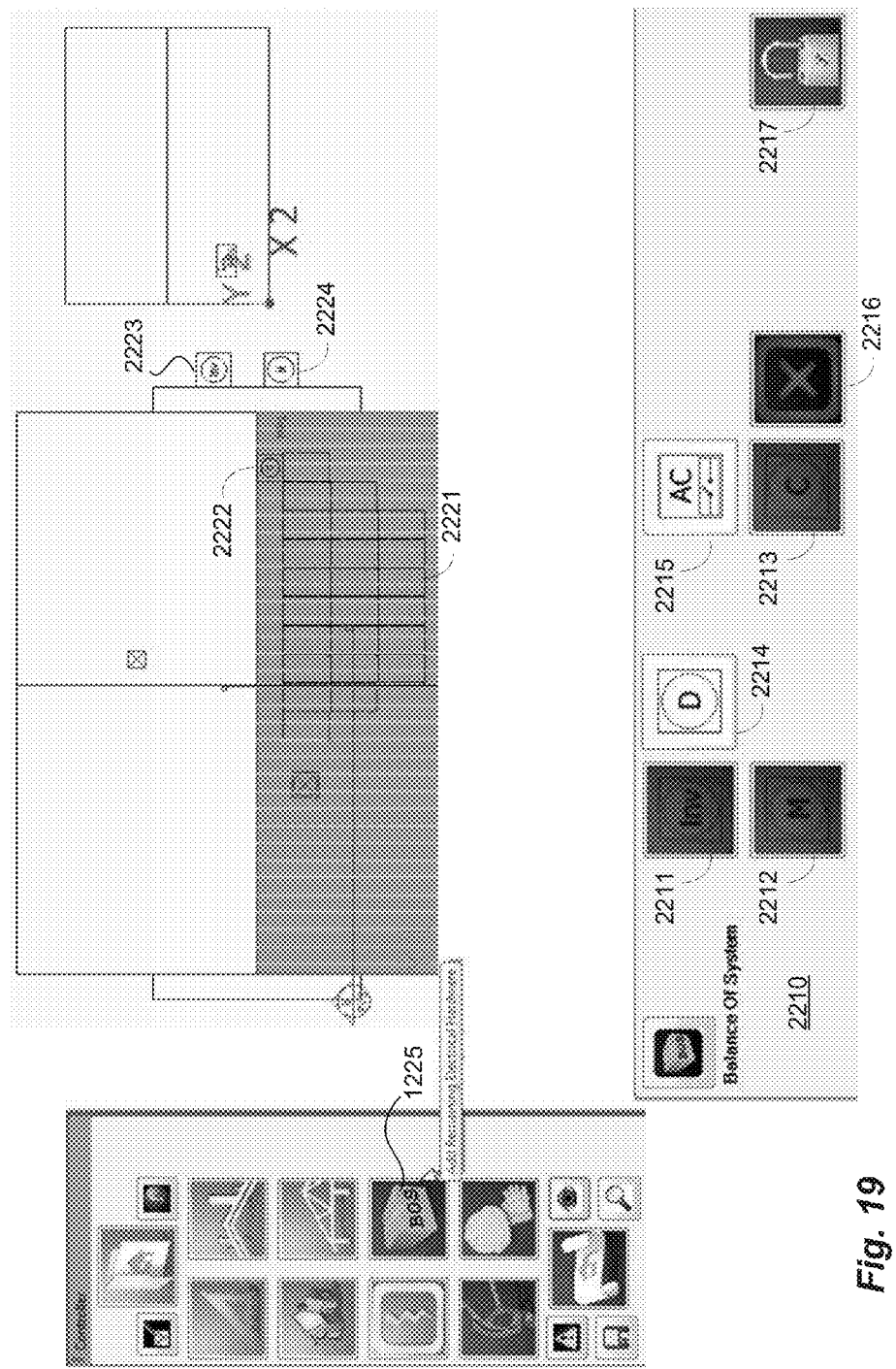
FIG. 19 is an example of a graphical user interface for selecting electrical components according to one embodiment of the present invention.

FIG. 19 illustrates a process to adding electrical hardware according to one example embodiment. In this example, a user may audit the site and enter and configure the electrical hardware required to install a solar energy system. For example, when a user selects the add electrical hardware icon 1225, an interface 2210 is displayed for selecting and configuring electrical components for the project. This process is also referred to as configuring the balance of the system ("Balance of System"). In this example, the system automatically analyzes the solar modules placed on the mounting plane and other electrical parameters and determines required electrical components for installing the system.

As mentioned above, embodiments may invoke an electrical stringing function to get an optimum installation stringing solution for the project. This function may return the module string lengths (and total number of those particular strings) with the associated photo-voltaic (PV) system, for example. In one embodiment, an electrical model may be generated based on the stringing configuration. For example, the system may examine each group of string lengths and determine their total power. For instance, if there are 6 strings of 10 modules and each module is 100 W, the total group is 6000 W. If the total power is greater than the largest available inverter, the group of strings may be cut in half, for example. In this example, if the largest inverter available in inventory is 5000 W, the system may break down the strings into two groups of 3 strings of 10 modules. In this example, given an optimum solution of string lengths and a breakdown of stringing groups into power levels for available inverters, the system builds an electrical model.

Figure 20:
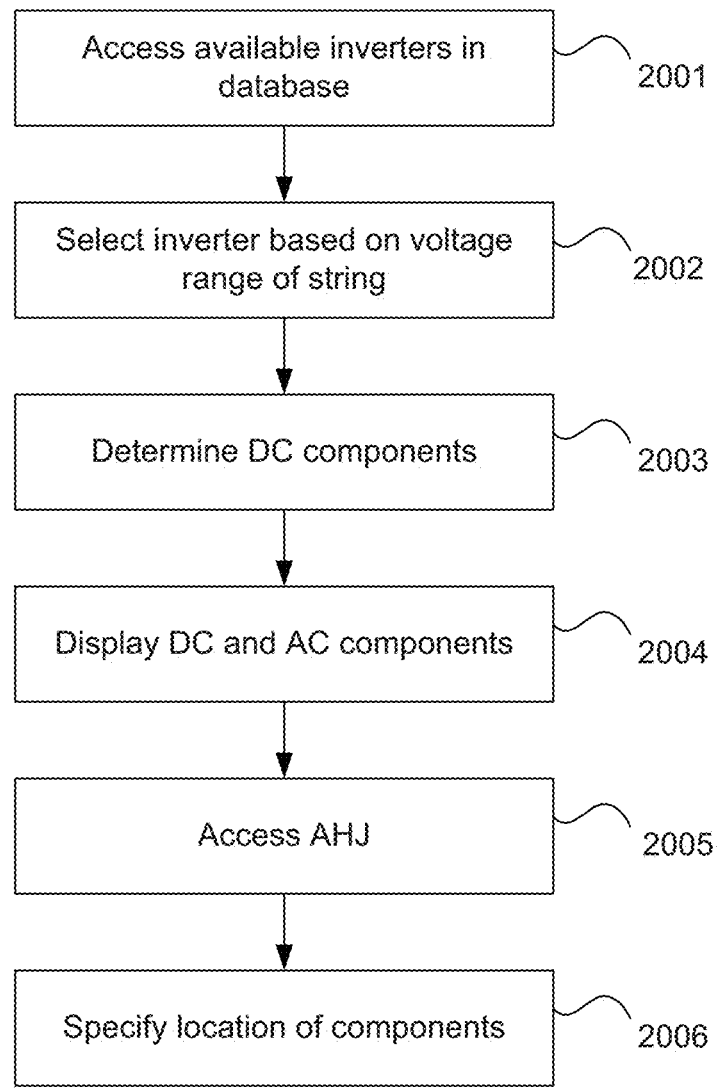
FIG. 20 is an example process for specifying electrical components according to one embodiment of the present invention.

FIG. 20 illustrates a process that may be performed on strings of panels according to one embodiment. For example, components may be determined for the DC side of the system for each inverter. At 2001, available inverters are accessed, for example, in a table or database. Groups of strings may be tested against the accessed inverters. At 2002, an inverter may be selected based on a voltage range of the string of panels, for example. For instance, the system may find the inverter with the best voltage window range for a particular string length. Inverters may have different voltage windows and the system may select an inverter automatically that can handle the power of the module strings and the voltage range of the string.

Once the inverter is selected, the system may determine the electrical components on the DC side at 2003. For example, the system may determine if a combiner box, junction box, or U-Joint connector is required, or if no method of combination on the roof is to be used, for example. An example component selection algorithm is illustrated in Appendix F. In one embodiment, the system may determine if a DC disconnect is need by checking if the AHJ requires a handled DC disconnect. If a DC disconnect is required and the particular inverter being used does not have a DC disconnect (as determined from the lookup table for the chosen inverter), a DC disconnect icon (not shown) may be presented to the user for selection and placement.

After the system has solved for the DC side of each inverter in the system under design, the system may determine the AC components. If there are more than two inverters, the design may need a load center. A load center combines the outputs of the inverters into a single wire path. If a load center is required, a load center icon (not shown) may be displayed to the end user, for example. The remaining AC Electrical components requirements may be determined from the AHJ database. The necessity of AC disconnects and PV Meters may also be stored in our AHJ database, for example.

Once all the electrical components are determined by the system, DC and AC components are displayed to the user at 2004. In some embodiments, the system may determine required DC components, and display the required DC components together with optional DC components and AC components. Example components that may be displayed include an inverter, a distribution panel, PV meter, AC disconnect, load center (for multiple inverters), meter main, DC disconnect, junction box, and combiner box, for example. In this example, a user may access an AHJ at 2005 to determine if the AHJ requires components not required by the electrical model. For example, an AHJ may require AC disconnects based upon conditions at the job site. If the auditor determines that the AC disconnect is necessary, he can simply draw one into the design area, and the AC disconnect is added to the electrical model. The same may be true for distribution panels. This ability can be expanded to any electrical component. At 2006, the user may select components and place the components in the design area. In one embodiment, different electrical components may have an associated draw count indicating the number of such components on the design area. When a user selects an icon for a particular component, the user may specify the location of the particular component in the design area. Each time an additional component of the same type is place in the design area, the draw count is incremented. As mentioned above, the user also has the option to draw electrical components that are not determined to be obligatory.

Referring again to FIG. 19, both required and optional electrical components for installing the system are displayed in electronic hardware interface 2210, including an inverter 2211, meter main 2212, distribution panel 2214, AC disconnect 2215, and combiner 2213. Other electrical components that may be displayed for use in other solar projects may include a DC disconnect, junction box, or a load center for multiple inverters, for example. Required components may be displayed in one color (e.g., red) and optional components may be displayed in another color (e.g., white). The user may select component icons from interface 2210 and place the components in the design area at particular locations based on the physical attributes of the actual site. In this example, the user has placed a combiner box 2222 next to the module array 2221 for combining the electrical outputs of the solar panels. An inverter 2223 is placed proximate to a location for the meter main 2224. In some embodiments, as required components are placed in the project design area, the required components may be removed (not displayed) from the component interface 2210. Delete icon 2216 may be used to delete components from the design area. When the required components are placed, the user may select the lock icon 2217 to indicate completion of this process step.

Figure 21A:
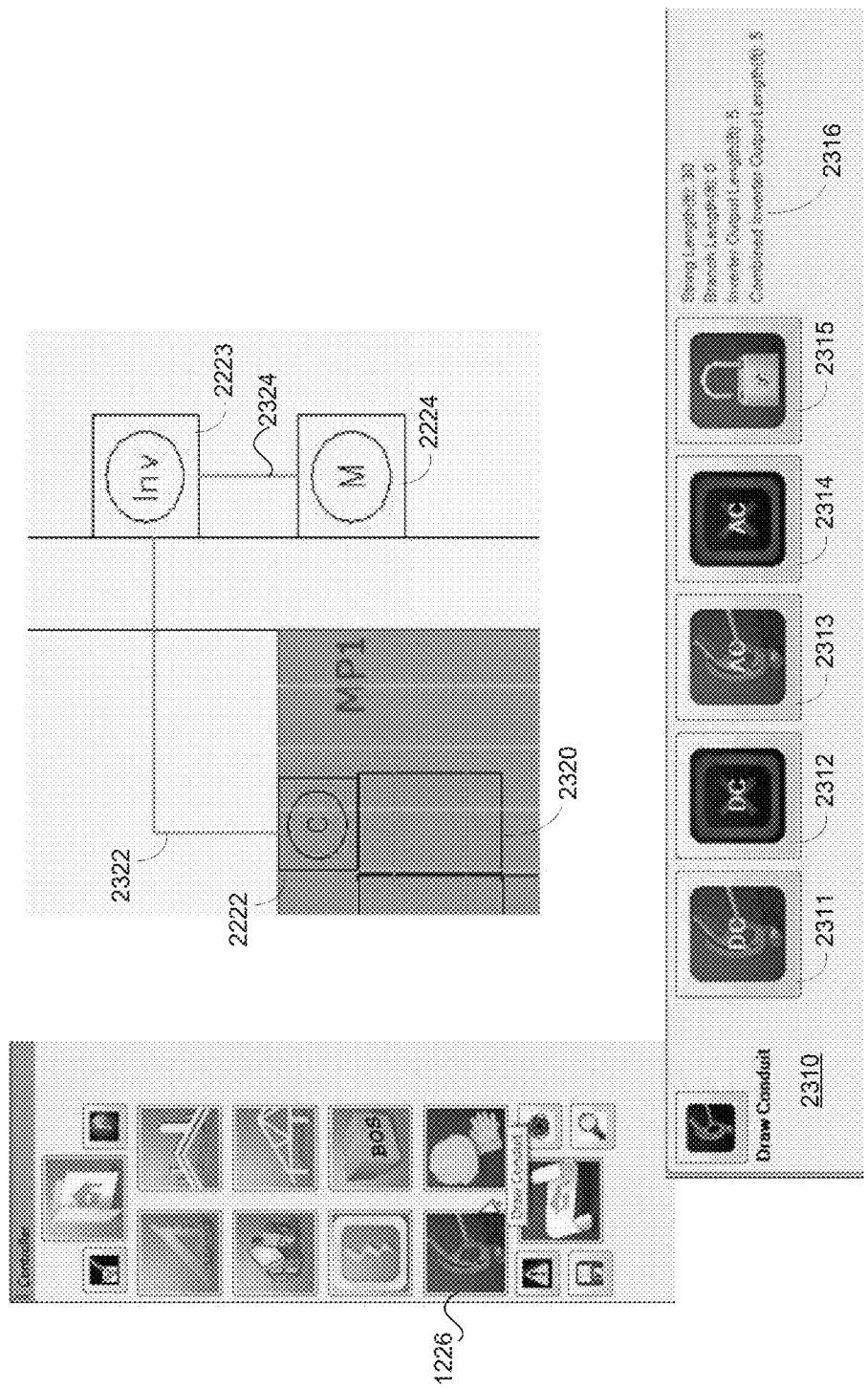

FIG. 21A illustrates a process to draw conduit according to one example embodiment. In this example, a user may audit the site and determine a desirable conduit routing to install the solar energy system. For example, when a user selects the draw conduit icon 1226, an interface 2310 is displayed for indicating the routing of AC and DC conduit in the design area of the project. For instance, when a user selects a DC conduit icon 2311, the system may allow the user to click and draw a DC conduit connection between combiner box 2222 and inverter 2223. Similarly, when a user selects an AC conduit icon 2313, the system allows the user to click and draw an AC conduit connection between inverter 2223 and meter main 2224. Delete DC conduit icon 2312 and delete AC conduit icon 2314 may be used to delete DC and AC conduit from the design area, respectively. In one embodiment, the system may require that the user start drawing conduit from the solar array, where current and voltage are generated, and end in the meter. The system may only allow start and end points for conduit at acceptable locations based on electrical properties of the components being connected by the conduit. For instance, DC outputs cannot be connected to AC inputs and AC outputs cannot be connected to DC inputs. For example, conduit starting on a combiner may not finish on a meter. As the user draws conduit on the project, the system may display to the user characteristics of the conduit such as string length, branch length, inverter output length, and combined inverter output length, for example. When the required conduits are configured in the project, the user may select the lock icon 2315 to indicate completion of this process step.

Figure 21B:
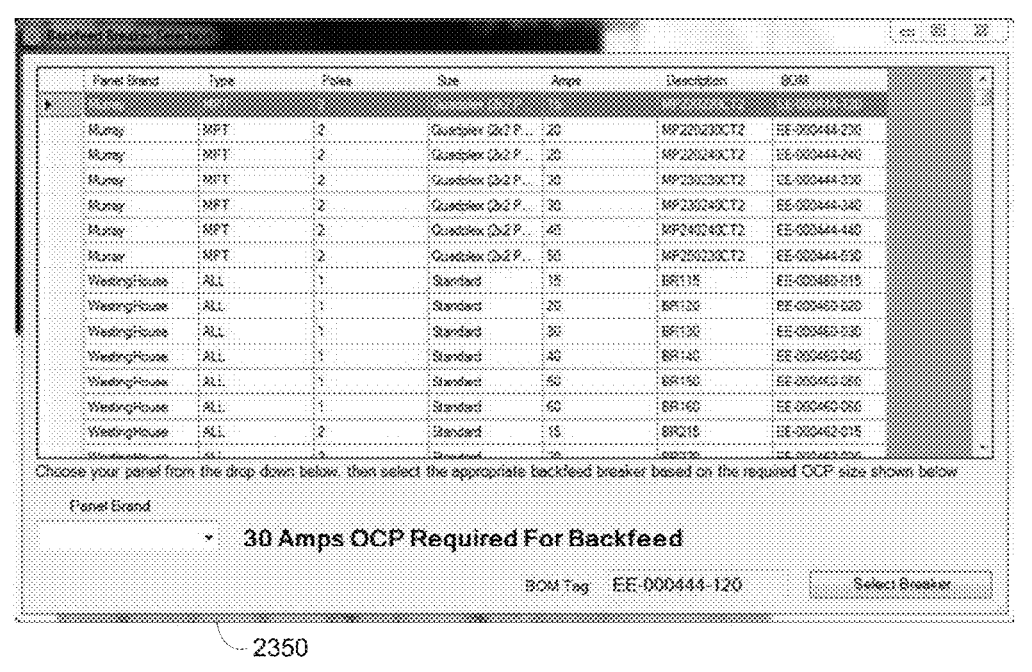

In one embodiment, after the components are placed and the conduit configured for the site, the system may prompt the user to select backfeed breakers by accessing and displaying data with backfeed breaker information as illustrated in FIG. 21B. Window 2350 displays different breaker panel brand, type, poles, size, amps, description, and bill of material (BOM). The user may select a particular panel from a drop down menu and select an appropriate backfeed breaker based on a required OCP size displayed in window 2350.

Figure 22:
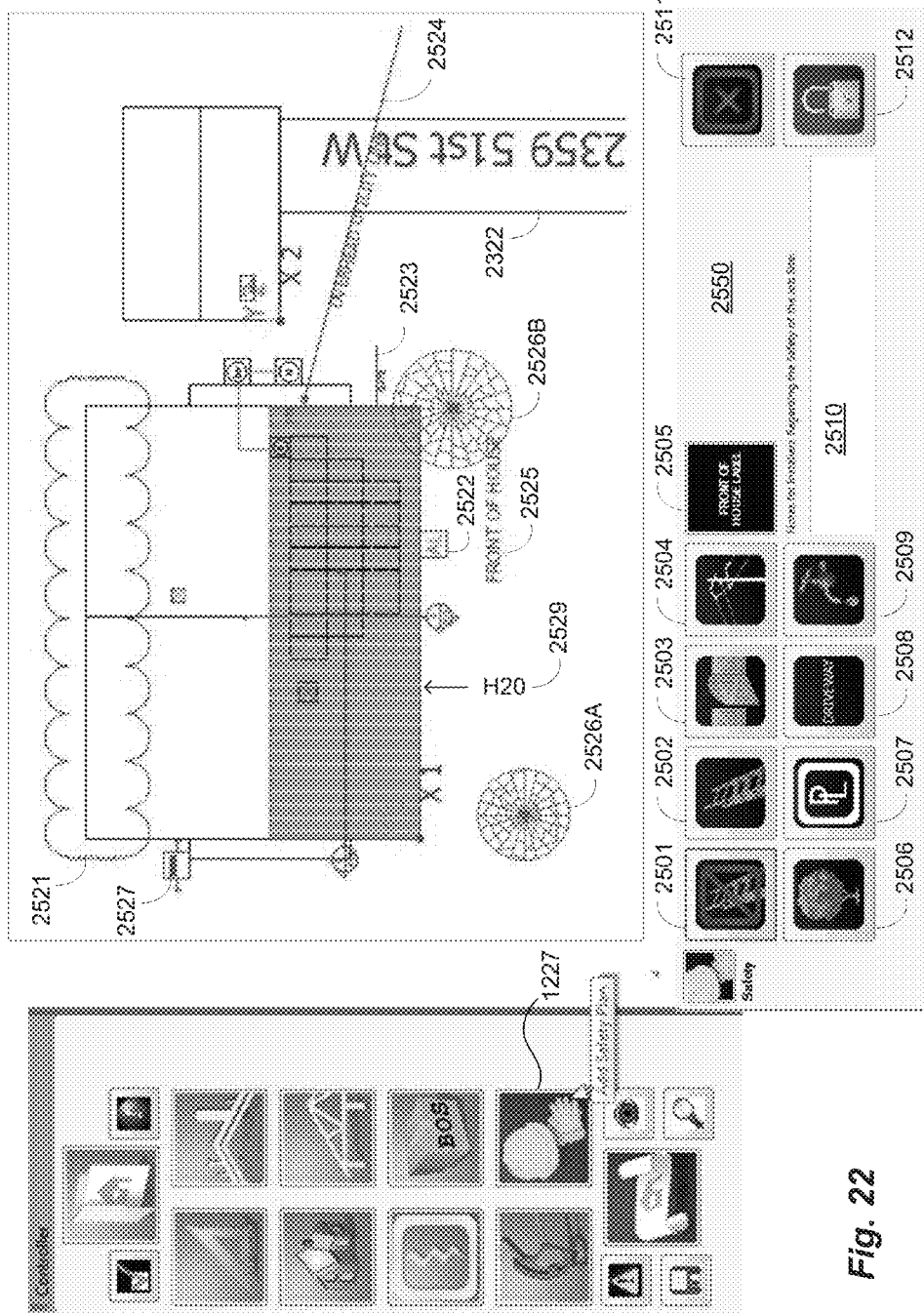
FIG. 22 is an example of a graphical user interface for specifying a safety plan according to one embodiment of the present invention.

FIG. 22 illustrates a process to adding a safety plan according to one example embodiment. In this example, a user may audit the site and enter and configure the a variety of physical attributes of the site that should be taken into consideration when installing a solar energy system. For example, when a user selects the add safety plan icon 1227, an interface 2550 is displayed for inserting physical attributes of the site into the project in the design area. In this example, interface 2550 includes an icon 2501 for placing a no ladder zone 2521 (e.g., locations on the site where ladders may not be placed), an icon 2502 for specifying acceptable locations for ladders (e.g., where the auditor placed their ladder 2522 during the audit), an icon 2503 for specifying the location of a gate 2523 in a fence, an icon 2504 of specifying the location of utility lines 2524, an icon 2505 for specifying the location of the front of a house 2525, an icon 2506 for specifying the location of one or more trees 2526A-B (e.g., a tree may be specified by specifying a first location with a mouse and specifying a radius for the tree), an icon for specifying distance between the edge of the house and a property line 2527 (e.g., a user may enter the actual distance between an object and the property line), an icon 2508 for specifying a driveway 2322, and an icon 2509 for specifying a location of a water outlet 2529, for example.

Interface 2550 may include a text entry area 2510 for entering notes corresponding to the safety plan, for example, a delete icon 2511 for deleting one or more safety plan objects in the project, and a lock icon 2512 to finish the safety plan.

Figure 23:
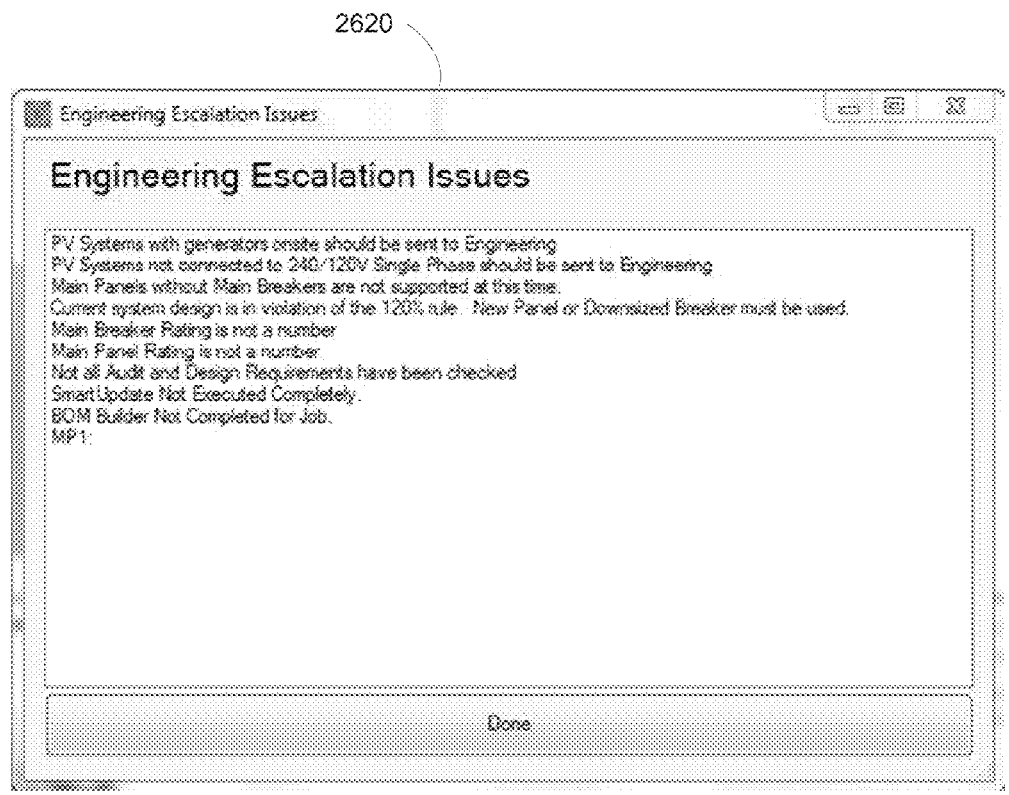
FIG. 23 is an example of engineering escalations according to one embodiment of the present invention.

FIG. 23 illustrates engineering escalations according to one example embodiment. As mentioned above, features and advantages of some embodiments may allow a user to enter physical attributes (i.e., parameters) of a design for a particular project into a mobile device, and the user may not be a highly trained design engineer. Accordingly, embodiments of the present invention may automatically analyze the data received from the user and determine if one or more aspects of the project need to be escalated to a more highly trained engineer. Since not all engineers are trained in the same expertise or to the same level, this may include field engineers escalating aspects of a project to design engineers in main office. In this example, interface 1201 from FIG. 10 includes an engineering escalation icon 1212. A user may select icon 1212 anytime during the design process and check to see if there are any engineering escalations listed. In this example, escalations are displayed in window 2620, which illustrates example escalations entries. As the physical parameters of a project are entered into the system by the user at each of the above described process steps, the physical parameters may be analyzed against escalation rules that determine if particular parameters or particular combinations of parameters violate the rules. If the rules are violated, an engineering escalation entry may be created, for example. The following are example engineering escalations and escalation rules applied to generate the escalations:

Engr. Esc.: "Multiple mounting plane systems need to be escalated to Engineering."
Esc. Rule: All multiple mounting plane systems may be sent to Engineering for verification.
Engr. Esc.: "BOM Builder Not Completed for Job."
Esc. Rule: If there is an error in the process and building the BOM fails, an escalation is raised (e.g., this could be caused by the auditor not entering the appropriate roof type, an electrical diagram that's too complex, or if the algorithm simply hits an error in CAD).
Engr. Esc.: "Flat Roof Freely Drawn in Design Area"
Esc. Rule: If a roof is freely drawn in the Design Area, it cannot have structural calculations performed on it and it needs to be drafted in the main office. This constitutes the job being sent to engineering.
Engr. Esc.: "MP#: Rafter Upgrades needed"
Esc. Rule: If a CAD drawn side view fails structural checks, then we need to raise an escalation and have the structure analyzed in house.

An example function from the Mounting Plane System class for generating escalations is in Appendix G. In one embodiment, classes in the data model store their escalations. The MountingPlaneSystem recalls escalations before uploading them to computers at the main office.

Referring again to FIG. 10, when a user has completed each of the process steps displayed in interface 1201, a user may select the generating installation documentation icon 1228. In this example, icon 1228 triggers the mobile device to generate installation documentation for the solar power installation project based on the input data. The installation documentation may be generated in the form of one or more PDF documents that include a permit set (e.g., permit information provided to a building department having jurisdiction over the project location), single line drawings (e.g., electrical drawings provided to a utility having jurisdiction over the project location), and construction documents that may comprise a set of instructions for the installation crews.

As mentioned above, some embodiments may modify a custom CAD template, which comprises blocks that fit together like legos. Templates may address every permutation of a PV system. As described above, a master template may be modified to generate a custom template for a particular project, and the custom template for the project is loaded into the system before performing the audit, for example. In one implementation, design requirements are stored in a database as rules linking job information to instructions for modifying the master template. For example, the system may include the following SQL statement: select [State] from vCustomersInstallationsACAD where JobID=@JobID. If the result of the query is "CA", then system may modify the master template. The system may associate a modification indicator (or modification type) with a particular rule. For example, for the above SQL statement which is executed and returns "CA", the system may associate a parameter indicating that a block is to be added if the result is "CA". The rule may also be associated with one or more particular blocks to be added. The above SQL statement may be associated with a block name, an address to access the CAD block, a specification of a portion of a block or attribute of the block to be modified, a priority, and/or a unique block ID. The following is one example:
Design Requirement:
SQL: select [State] from vCustomersInstallationsACAD where JobID=@JobID
SQL Result=True: CA (If SQL Result=CA, then modify master template)
Remove: 0 (0=add a block; 1=delete a block)
Block Location: C:\Common\Installs\Drafting\TEMPLATEBLOCKS.dwg
Block Name: TAG NOTE COVER GEN NOTES CA
Attribute: PT_1 (location to add text to block)
Block ID: 1 (unique block ID)
Priority: 1 (if two blocks are two be added to the same location, add block with higher priorty)

In the above example, for the state of California, the system may insert a general set of notes that are applicable to every county and AHJ for the project location. In the first directive, the system may test to see if the state is CA, and if so the system inserts a block onto the first page of the planset. Another design requirement may be as follows:
SQL: select [City] from vCustomersInstallationsACAD where JobID=@JobID
SQL Result=True: IRVINE (If SQL Result=IRVINE, then modify master template)
Remove: 0 (0=add a block; 1=delete a block)
Block Location: C:\Common\Installs\Drafting\TEMPLATEBLOCKS.dwg
Block Name: TAG NOTE COVER GEN NOTES CA IRVINE
Attribute: PT_1 (location to add text to block)
Block ID: 6 (unique block ID)
Priority: 5 (if two blocks are two be added to the same location, add block with higher priorty)

In the above case, a different block of text is to be inserted in the same place as a previous block. In one embodiment, each design requirement is associated with a priority. When two blocks are determined to be in conflicting positions in the custom template, the block with the higher priority is inserted into the custom template. Above, the second design requirement pertaining to IRVINE would take precedence because the priority is 5 versus a priority of 1 for the design requirement pertaining to CA. The following two design requirements illustrate deleting blocks from the master template. In the first case, D size pages are deleted, and in the second case, B size pages are deleted:

SQL: select PlanSize from AHJ where AHJID in (select distinct [AHJID] from vAHJ where (ahjid in (select [AHJID] from vCustomersInstallationsAHJ where jobid=@JobID) or utilityid in (select [utilityid] from vCustomersInstallations where jobid=@JobID))) and PlanSize < >"
SQL True: D
Remove: 1
Priority: 1
Block Location: C:\Common\Installs\Drafting\Template_MASTER.dwg
Block Name: B TEMPLATE VIEWPORTS
Attribute: NULL
Block ID: 29
SQL: select PlanSize from AHJ where AHJID in (select distinct [AHJID] from vAHJ where (ahjid in (select [AHJID] from vCustomersInstallationsAHJ where jobid=@JobID) or utilityid in (select [utilityid] from vCustomersInstallations where jobid=@JobID))) and PlanSize < >"
SQL True: B
Remove: 1
Priority: 1
Block Location: C:\Common\Installs\Drafting\Template_MASTER.dwg
Block Name: D TEMPLATE VIEWPORTS
Attribute: NULL
Block ID: 28

As mentioned above, some embodiments may map limited user input actions to multiple CAD functions. In a solar installation context, embodiments of the present invention may receive limited user inputs for placing and specifying a PV system at a site and generate a full model and schematics for the system. For instance, a user may complete the conduit run step as described above. When the user selects the lock button, the electrical data model is analyzed and translated into a CAD representation of blocks and BOM parts. The system automatically selects the blocks required to build a full 3-line electrical drawing including blocks for each component placed by the user on the roof of the home and electrical connectivity (wiring) between the components and descriptions for a plan set.

Figure 24:
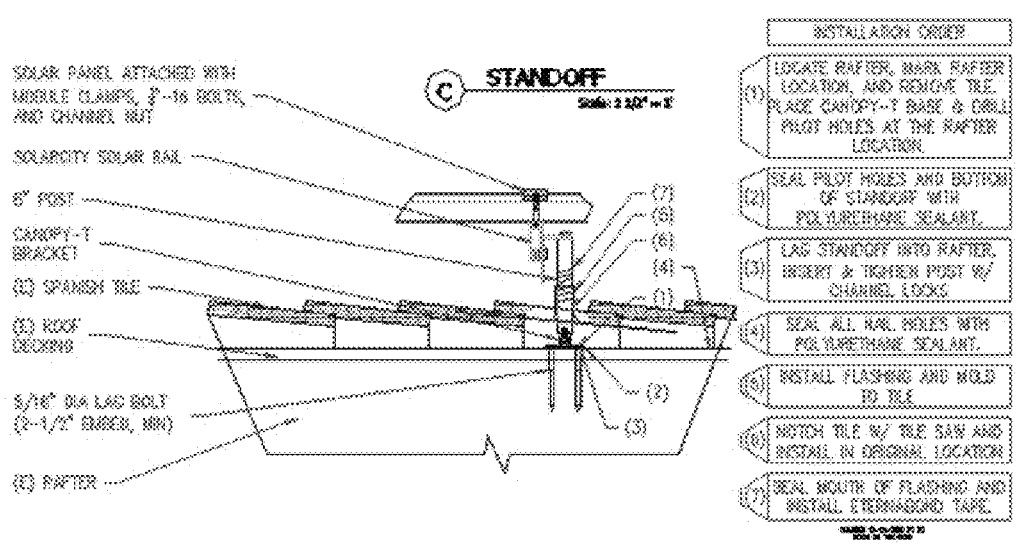
FIGS. 24-25 are examples of templates according to embodiments of the present invention.
Figure 25:
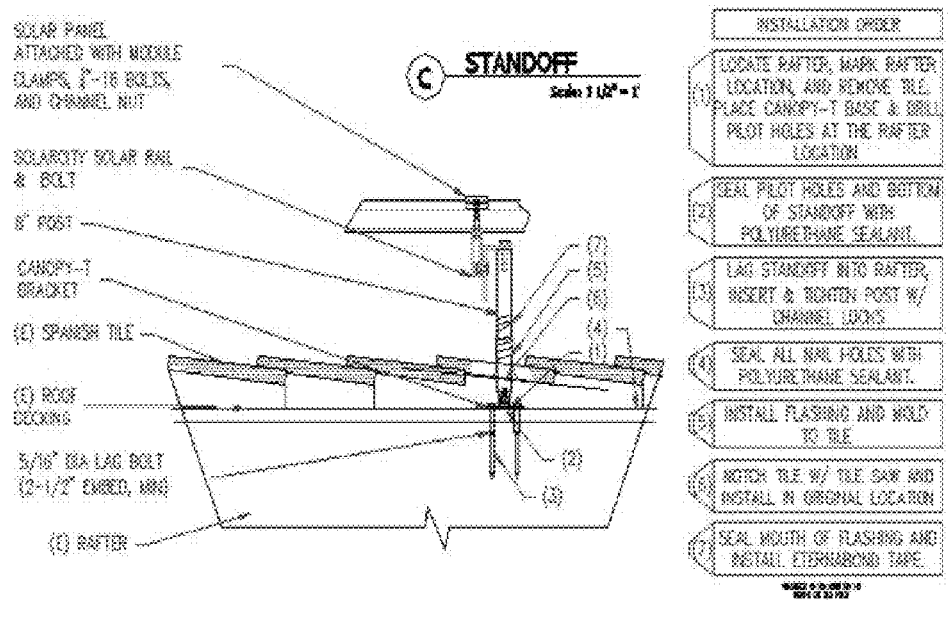

As another example, FIGS. 24-25 illustrate two mounting hardware block templates for mounting hardware for Spanish Tile with a 6 inch standoff and another template for mounting hardware for Spanish Tile with and 8 inch standoff. In this example, the system automatically selects blocks based on whether or not the auditor places solar panel modules over a vent on the roof, for example. These two templates may be used for all Spanish Tile roofs, for example. Bill of Material (BOM) blocks may be embedded in these templates, and their quantities may be updated by the program prior to the job being uploaded to computers (e.g., servers) at the main office.

Accordingly, the mobile system may include numerous CAD blocks for physical components (e.g., all available mounting hardware) and electrical components. The user may provide simple limited user interface actions to specify the solar design and the system may translate the limited user inputs into multiple CAD functions that result in a complete electrical model that represents the electrical properties of the system. A full plan set may be generated automatically by accessing and compiling numerous blocks based on the generated CAD functions, for example.

The Bill of Materials (BOM) may be contained within a CAD drawing. The metadata may be stored in CAD blocks. As mentioned above, a block is an entity within the CAD database, which may have a unique string identifier for its name. When the audit project is completed and uploaded back to the main office servers, the software may populate the BOM on the main office servers. Blocks are useful both for their storage of the BOM metadata, but also for their ability to be viewed easily by the end user in the output PDF, for example. BOM blocks may be embedded throughout the CAD files, and upon uploading the audit, the mobile design automation software may recursively search the CAD database, collects all the part numbers, and sends them to a database at the main office. For example, part numbers may be loaded into a supply chain management database, where the part numbers may be viewed and ordered by a user in a warehouse through the supply chain management software.

Figure 26:
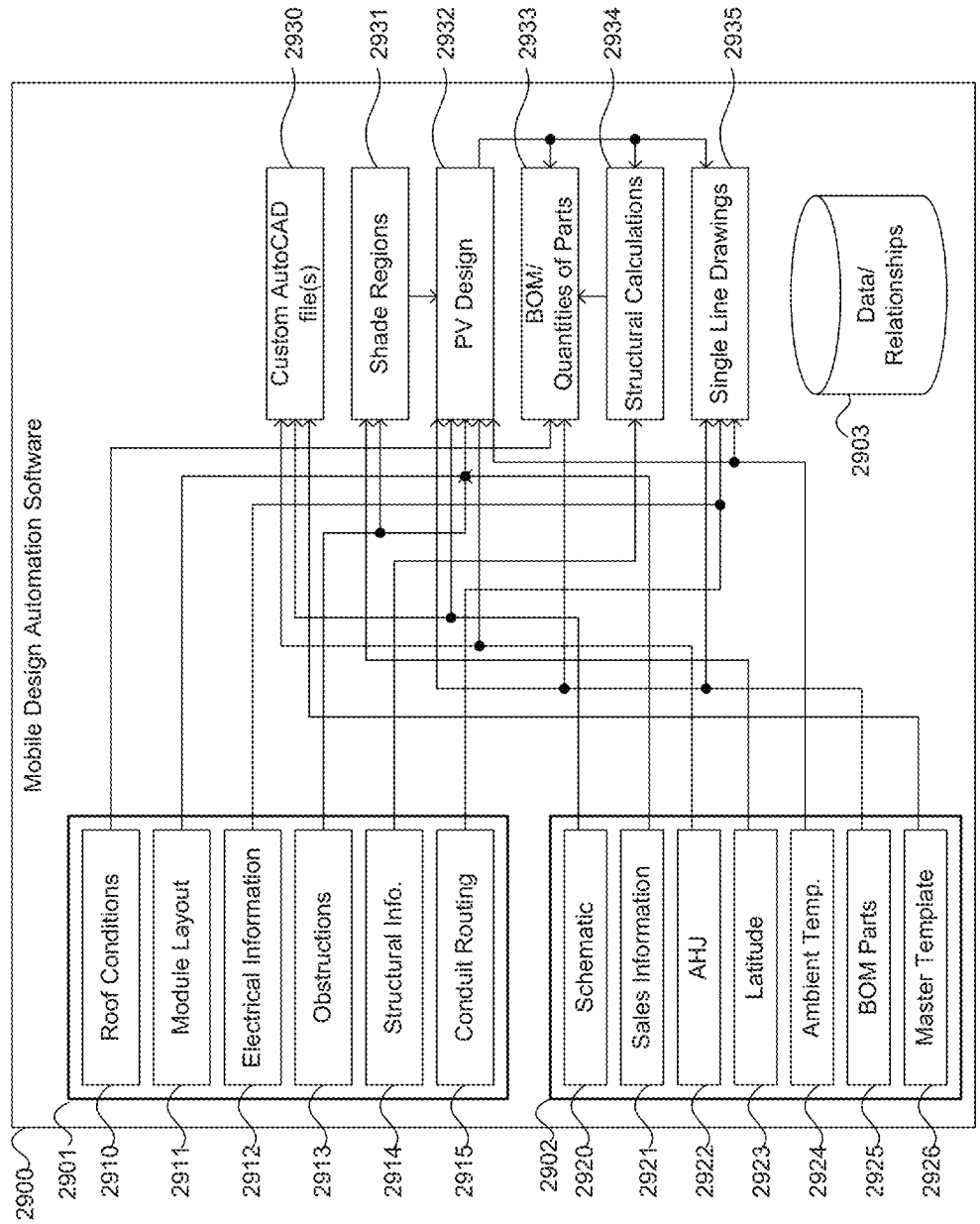
FIG. 26 is an example of input and output relationships for a solar project mobile design automation software system according to one embodiment of the present invention.

FIG. 26 illustrates relationships between inputs and outputs of an example mobile design automation software system according to one embodiment. A laptop, for example, may run a local version of a database 2903. The database, which may include an engineering reference database, may include relationships. For example, electrical part numbers may be associated with CAD representations as blocks (e.g., a Single Line drawer figures out the mapping of an Electrical Model to a particular Part Number and then consequently the CAD representation). Further, AHJ identifications may be associated with actions to customize a master template (e.g., AHJ ID 853 could require that the Elevation Drawing page be deleted). Mounting Hardware Part Numbers may be associated with a particular 'Type.' For example, a BOM builder component of the software may parse the drawing and determine the quantities of each 'Type' in a design. The software may then find all the BOM tags in the drawing, and fill in the appropriate quantities. BOM tags are determined from the templates, such as the templates described in the context of the mounting hardware above.

In one embodiment, a master template may be used as a basis for all of our permitting sets and construction plan sets generated by the software. Each AHJ may require a custom permit set (e.g., at the city level every building department wants to see different items represented and taken into account when permits are applied for). Often these are purely aesthetic items like simple notes or particular pages. A master template copied at the beginning of each audit and the newly copied template has actions applied to it from the AHJ database that may represent additions or removals of pages or items, for example.

FIG. 26 further illustrates a mapping of particular inputs received by the mobile design automation software 2900 to particular outputs. Inputs that are preloaded are illustrated at 2902 and inputs received from the user (e.g., an auditor) are illustrated at 2901. Outputs are shown at 2930-2935. Relationships are illustrated by arrows. In this example, the start of an audit (an initial custom formatted CAD file) is generated from schematic 2920 (e.g., Precigeo), AHJ Requirements 2922, and a Master Template 2926. A CAD file may be customized by a list of rules stored in the database that dictate whether items should be added or removed to/from an initial template. These rules may be based on AHJ requirements and geographic location of the job site, for example. The custom template may be required to pull a building department permit as well as to help the auditor know what information needs to be collected. The custom template is a sub-version of the master template. Portions of the master template are removed and additions are made to form the custom template. Shade Regions 2931 are automatically created by a preloaded latitude 2923 of the job site as well as the obstructions 2913 input by the auditor. Shade regions may be important due to their impact on the performance of the solar panel system. The PV Design 2932 is created from the sales information (sales proposal) 2921 (e.g., the customer expectation from the sales person of what will be installed on their roof), the AHJ Requirements 2922 (e.g., how far the panels need to be from the ridge or eave of the house), the schematic 2920, which may dictate the overall layout of the mounting planes, the Shade Regions 2931 (e.g., to avoid putting modules in them), the Ambient Temperature of the region 2924, which may dictates the available string lengths and whether or not a design is plausible, available BOM Parts 2925 from the supply chain (e.g., what modules are available), and the Module Layout 2911 that the auditor draws on the roof, for example. The Bill of Materials and Quantities of Parts 2933 may be dictated by the Roof Conditions 2910 (e.g., Comp Shingle, Spanish Tile, etc. . . . ), available BOM Parts 2925, the PV Design 2932 (whether the design spans vents), and the Structural Calculations 2934, which may dictate the quantities of the standoffs for the array, for example. The Structural Calculations 2934 may be derived from the auditor's drawing of the Structural Information 2914 underneath the roof (e.g., where the 2×4's are, what points they hit, whether or not they are load bearing) and the PV Design 2932 (e.g., specifically determining where the modules are placed on the roof and their consequent point loads on the rafter in the system). The Single Line Drawing 2935 may be derived from the auditors input Electrical Information 2912 (e.g., what type of panel, whether or not breakers are available, etc), the Ambient Temperatures 2924 (e.g., what size wires are required for given temperatures), the available BOM Parts 2925 from the supply chain, which may dictate what inverters are available, the PV Design 2932 which may specify how many modules at particular tilts and azimuths need to be drawn, and the conduit routing 2915 that the auditor draws in, which may change the wire sizes of the different component connections based upon their length.

EXAMPLE IMPLEMENTATION IN HARDWARE

Figure 27:
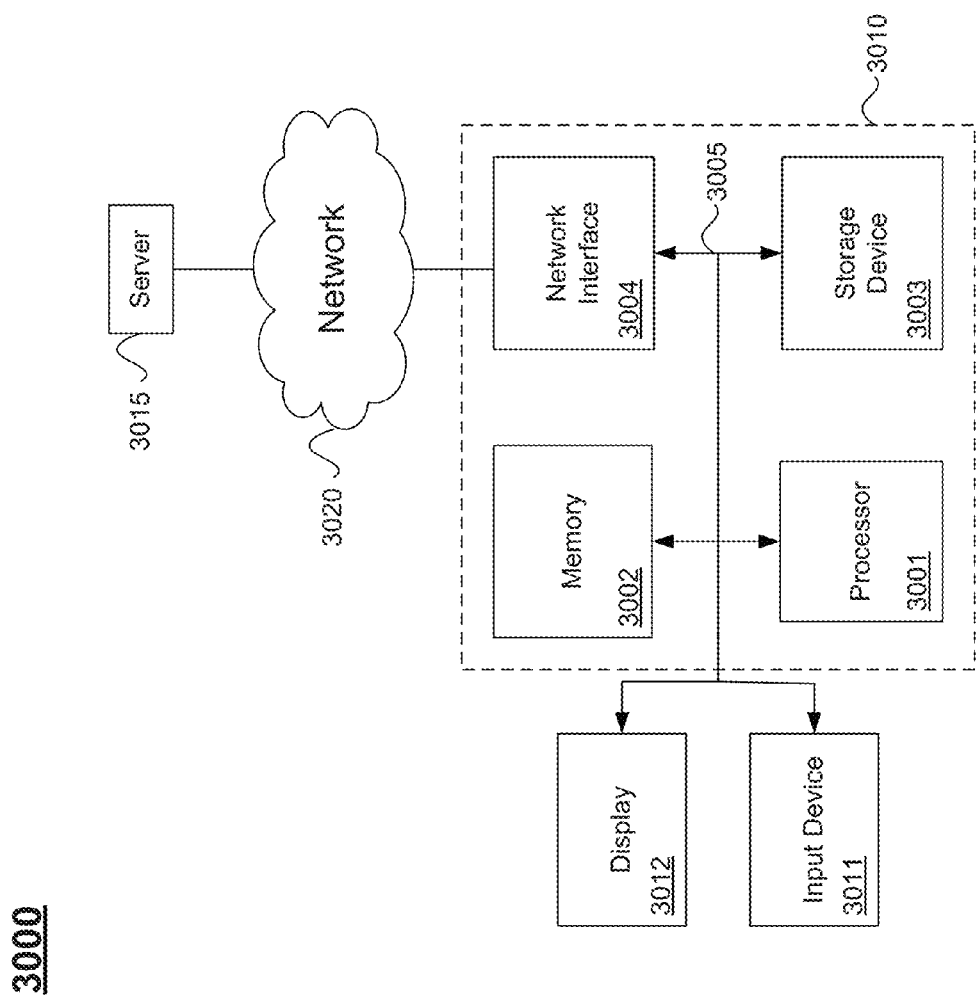
FIG. 27 illustrates hardware of a special purpose computing machine configured with a mobile design automation process according to one embodiment of the present invention.

FIG. 27 illustrates hardware of a computing machine configured with a mobile design automation process according to one embodiment of the present invention. As mentioned above, mobile design automation software according to some embodiments may be implemented on a laptop computer, tablet computer, or other portable computer system, for example. An example mobile computer system 3010 is illustrated in FIG. 27. Computer system 3010 includes at least one bus 3005 or other communication mechanism for communicating information, and one or more processors 3001 coupled with bus 3005 for processing information. Computer system 3010 also includes a memory 3002 coupled to bus 3005 for storing information and instructions to be executed by processor 3001, including information and instructions for performing the techniques described above, for example. Possible implementations of this memory may be, but are not limited to, random access memory (RAM), read only memory (ROM), or both. A storage device 3003 is also provided for storing information and instructions. Common forms of storage devices include, for example, a hard drive, a magnetic disk, an optical disk, a CD-ROM, a DVD, a non-volatile memory (e.g., flash memory), a USB memory card, or any other non-transitory computer readable medium. Storage device 3003 may include source code, binary code, or software files for performing the techniques above, for example. Storage device and memory are both examples of non-transitory computer readable mediums.

Computer system 3010 may be coupled via a bus to a visual display 3012 for displaying information to a computer user. An input device 3011 such as a touch screen, track pad, keyboard and/or mouse is coupled to a bus for communicating information and command selections from the user to processor 3001. The combination of these components allows the user to communicate with the system. In some systems, bus 3005 may be divided into multiple specialized buses of which bus 3005 is representative.

Computer system 3010 may include one or more network interfaces 3004. Network interface 3004 may provide two-way data communication between computer system 3010 and a wired and/or wireless 3020, for example. The network interface 3004 may be a digital subscriber line (DSL) or a modem to provide data communication connection over a telephone line, for example. Another example of the network interface is a local area network (LAN) to provide a data communication connection to a compatible LAN. Network interface 3004 may alternatively be a wireless interface such as a cellular phone interface, 802.11, or Bluetooth interface, for example. In any such implementation, network interface 3004 sends and receives electrical, electromagnetic, or optical signals that carry digital data streams representing various types of information.

Computer system 3010 may send and receive information through the network interface 3004 across network 3020 (e.g., a local network or wireless network) which may include the Internet. Computer system 3010 may communicate with a computer at a main office, such as server 3015 (e.g., when an auditor is at the main office or remotely). Accordingly, computer system 3010 and server 3015 may send and receive information pertaining to design projects to be processed according to the techniques described above. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method performed by a computing device configured to perform the method, the method comprising:
    receiving a design specification for a solar power installation project, the design specification identifying a total number of solar panel modules to be installed at a site and placement of each solar panel module at the site;
    loading possible string lengths for the solar panel modules, the possible string lengths being associated with one or more inverters available for installation at the site; and
    when the design specification is determined feasible in view of the possible string lengths:
        organizing the solar panel modules into stringing groups, each stringing group comprising solar panel modules that share a mounting region at the site; and when the design specification is determined feasible in view of the stringing groups:
  determining possible stringing solutions in view of the stringing groups and the possible string lengths;
  generating a numerical weighted value for each possible stringing solution based on one or more factors, the factors comprising: the number of inverters, variation in string length and the number of strings, wherein the number of inverters is weighted more heavily than the other factors such that each additional inverter after a first inverter impacts the numerical weighted value by a predetermined amount;
  selecting an optimal stringing solution from the possible stringing solutions based on the numerical weighted value;
  placing a required number of the solar panel modules in the mounting region to complete a module design that meets a target energy generation specification of the selected possible stringing solution; and
  generating design documents using the module design.

2. The method of claim 1 wherein a string length is deemed possible when, at a predefined ambient temperature, the string length has a string voltage potential that falls within an allowable range of input voltages for a specific inverter selected for installation at the site.

3. The method of claim 1 wherein evaluating whether the design specification is feasible in view of the possible string lengths comprises determining whether the total number of solar panel modules can be split according to the possible string lengths.

4. The method of claim 1 further comprising, when the design specification is not feasible in view of the possible string lengths or the possible stringing groups, notifying the user that the design specification is invalid.

5. The method of claim 1 wherein each solar panel module of a particular stringing group shares a similar tilt and azimuth.

6. The method of claim 1 wherein evaluating whether the design specification is feasible in view of the stringing groups comprises determining, for each stringing group, whether the number of solar panels in the stringing group can be split according to the possible string lengths.

7. The method of claim 1 further comprising, when the design specification is not feasible in view of the stringing groups, notifying the user that the design specification is invalid.

8. The method of claim 1 wherein determining possible stringing solutions in view of the stringing groups and the possible string lengths comprises, for each stringing group:
  determining combinations of possible string lengths for the stringing group such that a summation of each combination equals the total number of solar panel modules in the stringing group.

9. The method of claim 1, wherein selecting an optimal stringing solution comprises selecting the possible stringing solution with the lowest numerical weighted value.

10. The method of claim 1 wherein the predetermined amount is twenty.

11. A non-transitory computer readable medium having stored thereon program code that, when executed by a computing device, causes the computing device to:
  receive, from a user, a design specification for a solar power installation project, the design specification identifying a total number of solar panel modules to be installed at a site and placement of each solar panel module at the site;
  load possible string lengths for the solar panel modules, a string length being deemed possible when the string length has a string voltage potential that falls within an allowable range of input voltages for one or more inverters available for installation at the site; and
  when the design specification is determined feasible in view of the possible string lengths:
    organize the solar panel modules into stringing groups, each stringing group comprising solar panel modules that share a mounting region at the site; and
    when the design specification is determined feasible in view of the stringing groups:
      determine possible stringing solutions in view of the stringing groups and the possible string lengths;
      generate a numerical weighted value for each possible stringing solution based on one or more factors, the factors comprising the number of inverters, variation in string length and the number of strings, wherein the number of inverters is weighted more heavily than the other factors such that each additional inverter after a first inverter impacts the numerical weighted value by a predetermined amount;
      select an optimal stringing solution from the possible stringing solutions based on the numerical weighted value;
      place a required number of the solar panel modules in a mounting region to complete a module design that meets a target energy generation specification of the selected possible stringing solution; and
      generate design documentation that includes the module design.

12. The non-transitory computer readable medium of claim 11 wherein the optimal stringing solution is the possible stringing solution with the lowest numerical weighted value.

13. A computing device, comprising:
  a processor configured to:
    receive, from a user, a design specification for a solar power installation project, the design specification identifying a total number of solar panel modules to be installed at a site and placement of each solar panel module at the site;
    load possible string lengths for the solar panel modules, a string length being deemed possible if the string length has a string voltage potential that falls within an allowable range of input voltages for one or more inverters available for installation at the site; and
    when the design specification is determined to be feasible in view of the possible string lengths:
      organize the solar panel modules into stringing groups, each stringing group comprising solar panel modules that share a mounting region at the site; and
      when the design specification is determined to be feasible in view of the stringing groups:
        determine possible stringing solutions in view of the stringing groups and the possible string lengths;
        generate a numerical weighted value for each possible stringing solution based on one or more factors comprising the number of inverters, variation in string length and the number of strings, wherein the number of inverters is weighted more heavily than the other factors such that each additional inverter after a first inverter impacts the numerical weighted value by a predetermined amount; and select an optimal stringing solution from the possible stringing solutions based on the numerical weighted value;

place a required number of the solar panel modules in the mounting region to complete a module design that meets a target energy generation specification of the selected possible stringing solution; and generate design documentation using the module design.

14. The computing device of claim 13 wherein the processor is configured to select the possible stringing solution with the highest numerical weighted value.

* * * * *